(12) United States Patent
Bosscher et al.

(10) Patent No.: US 7,753,642 B2
(45) Date of Patent: Jul. 13, 2010

(54) APPARATUS AND METHOD ASSOCIATED WITH CABLE ROBOT SYSTEM

(75) Inventors: Paul M. Bosscher, West Melbourne, FL (US); Robert L. Williams, II, Athens, OH (US)

(73) Assignee: Ohio University, Athens, OH (US)

( * ) Notice: Subject to any disclaimer, the term of this patent is extended or adjusted under 35 U.S.C. 154(b) by 134 days.

(21) Appl. No.: 11/850,984

(22) Filed: Sep. 6, 2007

(65) Prior Publication Data

US 2009/0066100 A1     Mar. 12, 2009

(51) Int. Cl.
*B25J 11/00*     (2006.01)
(52) U.S. Cl. ..................... 414/735; 52/745.2
(58) Field of Classification Search ........... 414/735; 901/21; 52/125.1, 745.19, 745.2; 74/490.08, 74/490.09, 490.04; 187/251
See application file for complete search history.

(56) References Cited

U.S. PATENT DOCUMENTS

| | | | |
|---|---|---|---|
| 4,749,347 A | 6/1988 | Valavaara | |
| 4,883,184 A | 11/1989 | Albus | |
| 5,440,476 A | 8/1995 | Lefkowitz et al. | |
| 5,529,471 A | 6/1996 | Khoshevis | |
| 5,568,189 A | 10/1996 | Kneller | |
| 5,585,707 A | 12/1996 | Thompson et al. | |
| 5,656,230 A | 8/1997 | Khoshevis | |
| 6,345,724 B1 | 2/2002 | Masumoto et al. | |
| 6,566,834 B1 | 5/2003 | Albus et al. | |
| 6,648,102 B2 | 11/2003 | Bostelman et al. | |
| 6,809,495 B2 | 10/2004 | Rodnunsky | |
| 6,826,452 B1 | 11/2004 | Holland et al. | |
| 7,088,071 B2 | 8/2006 | Rodnunsky | |
| 7,172,385 B2 | 2/2007 | Khajepour et al. | |
| 2004/0146388 A1* | 7/2004 | Khajepour et al. | .......... 414/680 |

OTHER PUBLICATIONS

Aerial Cable Range, POC Maj Tim Marshall, CF Liaison Office (CFLO), US Army Test & Eval Command (TECOM), Aberdeen Proving Ground, MD, SECO Modeling and Simulation Resource Repository, www.drdc-rddc.gc.ca/seco/msrr/view_e.asp?id=189, printed Feb. 10, 2008, 2 pages (Sep. 16, 2005).

(Continued)

*Primary Examiner*—Donald Underwood
(74) *Attorney, Agent, or Firm*—Calfee, Halter & Griswold LLP

(57) ABSTRACT

An apparatus associated with a cable robot system is provided. In one embodiment, the apparatus includes: an end-effector platform adapted to be positioned and maneuvered within a three-dimensional (3D) workspace, three vertical support members adapted to be positioned outside the 3D workspace, and three adjustable cables adapted to be routed from each vertical support member and releasably secured to the end-effector platform to apply upward and downward tension to the end-effector platform. The adjustable cables are adapted to be adjustably extended and retracted in a coordinated fashion to maneuver the end-effector platform such that an adjustable portion of each adjustable cable spans from the corresponding vertical support member to the end-effector platform. At least two of the adjustable portions associated with each vertical support member are generally in parallel relation to each other.

25 Claims, 15 Drawing Sheets

OTHER PUBLICATIONS

Aerial Cable Test Range—Now Open, US Army, Public Affairs Office, White Sands Missile Range, NM, 2 pages (1994).

Albus et al., The Nist Robocrane, Journal of Robotic Systems, 10(5), pp. 709-724 (1993).

Williams II, Kinematics of an In-Parallel Actuated Manipulator Based on the Stewart Platform Mechanism, NASA Technical Memorandum 107585, NASA Langley Research Center, Hampton, VA, 54 pages (Mar. 1992).

Amano, H., et al., Development of vertically moving robot with gripping handrails for fire fighting, Proceedings of the 2001 IEEE/RSJ International Conference on Intelligent Robots and Systems (IROS 2001), vol. 2, pp. 661-667 (Oct. 29-Nov. 3, 2001).

Bonev, The True Origins of Parallel Robots, The Parallel Mechanisms Information Center (MIC), www.parallemic.org/Reviews/Review007.html, printed Feb. 7, 2008, 9 pages (Jan. 24, 2003).

Murphy, Marsupial robots for urban search and rescue, IEEE Journal of Intelligent Systems, 15(2), Mar. 2000, pp. 14-19.

Oh et al., A Reference Governor-Based Controller for a Cable Robot Under Input Constraints, IEEE Transactions on Control Systems Technology, vol. 13, No. 4, pp. 639-645 (Jul. 2005).

Bosscher et al., A Stability Measure for Underconstrained Cable-Driven Robots, 2004 IEEE International Conference on Robotics and Automation, New Orleans, LA, vol. 1, pp. 4943-4949 (Apr. 2004).

Yingjie et al., Feedback Control of a Cable-Driven Gough-Stewart Platform, IEEE Transactions on Robotics, vol. 22, No. 1, pp. 198-202 (Feb. 2006).

Oh et al., Generation of Feasible Set Points and Control of a Cable Robot, IEEE Transactions on Robotics, vol. 22, No. 3, pp. 551-558 (Jun. 2006).

Bosscher et al., Disturbance Robustness Measures for Underconstrained Cable-Driven Robots, 2006 IEEE International Conference on Robotics and Automation, Orlando, FL, pp. 4205-4212 (May 2006).

Wolf, A., et al., "A mobile hyper redundant mechanism for search and rescue tasks," Proceedings of the 2003 IEEE/ RSJ International Conference on Intelligent Robots and Systems (IROS 2003), vol. 3, 2003, Las Vegas, NV, pp. 2889-2895 (Oct. 27-31, 2003).

Park et al., Wire-Suspended Dynamical System: Stability Analysis by Tension-Closure, IEEE Transactions on Robotics, 21(3), pp. 298-308 (Jun. 2005).

Bosscher et al., Wrench-Feasible Workspace Generation for Cable-Driven Robots, IEEE Transactions on Robotics, 22 (5), pp. 890-902, (Oct. 2006).

Pusey et al., Design and Workspace Analysis of a 6-6 Cable-Suspended Parallel Robot, Elsevier: Mechanism and Machine Theory, 39, pp. 761-778 (2004).

Bostleman et al., Applications of the Nist Robocrane, Robotics and Manufacturing, vol. 5, pp. 403-407 (1994).

Campbell et al., Charlotte Robot Technology for Space and Terrestrial Applications, 25th International Conference on Environmental Systems, San Diego, SAE Article 951520, 8 pages (1995).

Riechel et al., Concept Paper: Cable-Driven Robots for Use in Hazardous Environments, 10th International Topical Meeting on Robotics and Remote Systems for Hazardous Environments, Gainesville, FL, 7 pages (Mar./Apr. 2004).

Riechel, et al., Force-feasible workspace analysis for underconstrained, point-mass cable robots, 2004 IEEE International Conference on Robotics and Automation, vol. 5, New Orleans, LA, pp. 4956-4962 (Apr. 26-May 1, 2004).

Gillert, Desert Rope Lassos Missile Test Savings, American Forces Press Service, www.defenslink.mil/news/newsarticle. aspx?id=41488, printed Feb. 10, 2008, 1 page (May 30, 1997).

Stewart, A Platform with Six Degrees of Freedom, Proceedings of the Instn Mech Engrs, vol. 180, Part 1, No. 15, pp. 371-385 (1965-66).

Gough et al., Universal Tyre Test Machine, Proceedings of the Fisita Ninth International Technical Congress, pp. 117-137 (1962).

Usher et al., A Cable-Array Robot for Air Vehicle Simulation, Proceedings of the Australian Conference on Robotics and Automation, Canberra, Australia, 8 pages (Dec. 6-8, 2004).

Williams II et al., Cable-Based Metrology System for Sculpting Assistance, CD Proceedings of the 2003 ASME Design Technical Conferences, 29th Design Automation Conference, Chicago, IL, 10 pages (Sep. 2-6, 2003).

Williams II et al., Planar Cables-Suspended Haptic Interface: Design for Wrench Exertion, CD Proceedings of the 1999 ASME Design Technical Conferences, 25th Design Automation Conference, DETC99/DAC-8639, Las Vegas, NV, 7 pages (Sep. 12-15, 1999).

Williams II et al., Planar Translational Cable-Direct-Driven Robots, Journal of Robotic Systems, 20(3), pp. 107-120 (2003).

Williams II et al., Seven-DOF Cable-Suspended Robot with Independent Metrology, CD Proceedings of the ASME Design Technical Conferences, 28th Biennial Mechanisms and Robotics Conference, Paper # DETC2004/MECH-57125, Salt Lake City, UT, 9 pages (Sep. 28-Oct. 2, 2004).

Lafourcade et al., Design of a Parallel Wire-Driven Manipulator for Wind Tunnels, Proceedings of the Workshop on Parallel Mechanisms and Manipulators, Quebec City, Canada: pp. 187-194 (Oct. 3-4, 2002).

Williams II et al., Translational Planar Cable-Direct-Driven Robots, Journal of Intelligent and Robotic Systems, 37, pp. 69-96 (2003).

Micire, Analysis of the robotic-assisted search and rescue response to the world trade center disaster, University of South Florida, Tampa, FL, 108 pages (Jul. 17, 2002).

Albus et al., The NIST Spider: A Robot Crane, Journal of Research of the National Institute of Standards and Technology, May-Jun. 1992, vol. 97, No. 3, pp. 373-385.

Bonivento et al., WireMan: A Portable Wire Manipulator for Touch-rendering of Bas-Relief Virtual Surfaces, Proceedings of the 8th International Conference on Advanced Robotics (ICAR), Monterey, CA, Jul. 7-9, 1997, pp. 13-18.

Bosscher et al., A Concept for Rapidly-deployable Cable Robot Search and Rescue Systems, Proceedings of the Interational Design Engineering Technical Conference (IDETC) and Computers and Information in Engineering (CIE) Conference, Long Beach, CA, Sep. 24-28, 2005, 10 pages.

Bosscher et al., Cable-suspended Robotic Contour Crafting System, Proceedings of the International Design Engineering Technical Conference (IDETC) and Computers and Information in Engineering (CIE) Conference, Philadelphia, PA, Sep. 10-13, 2006, 9 pages.

Bosscher, Disturbance Robustness Measures and Wrench-feasible Workspace Generation Techniques for Cable-driven Robots, Ph.D Thesis, George W. Woodruff School of Mechanical Engineering, Georgia Institute of Techology, Nov. 2004, 197 pages.

Bosscher, Wrench-Based Analysis of Cable-driven Robots, Proceedings of the IEEE International Conference on Robotics & Automation, New Orleans, LA, Apr. 2004, pp. 4950-4955.

Clavel, Delta: A Fast Robot with Parallel Geometry, Proceedings of the International Symposium on Industrial Robots, Apr. 1988, pp. 91-100.

Cone, Skycam: An Aerial Robotic Camera System, BYTE Magazine, Oct. 1985, pp. 122-124, 126, 128, 130, 132.

Gorman et al., The Cable Array Robot: Theory and Experiment, Proceedings of the IEEE International Conference on Robotics & Automation, Seoul, Korea, May 21-26, 2001, pp. 2804-2810.

Havlik, A Cable Suspended Robotic Manipulator for Large Workspace Operations, Civil Engineering, The Ohio State University, Columbus, OH, 2000, 13 pages.

Joshi et al., Calibration of a 6-DOF Cable Robot Using Two Inclinometers, Performance Metrics for Intelligent Systems, Gaithersburg, MD, Sep. 16-18, 2003, 6 pages.

Kawamura et al., Development of an Ultrahigh Speed Robot Falcon using Wire Drive System, Proceedings of the IEEE International Conference on Robotics & Automation, Nagoya, Japan, May 1995, pp. 215-220.

Khalil et al., Self Calibration of Stewart-Gough Parallel Robots Without Extra Sensors, IEEE Transactions on Robotics and Automation, Dec. 1999, vol. 15, No. 6, pp. 1116-1121.

Khoshnevis et al., Automated Construction Using Contour Crafting: Applications on Earth and Beyond, Proceedings of the International Symposium on Automation and Robotics in Construction (ISARC), National Institute of Standards and Technology (NIST), Gaithersburg, MD, Sep. 23-25, 2002, pp. 489-494.

Khoshnevis, Automated Construction by Contour Crafting: Related Robotics and Information Technologies, Automation in Construction, Special Issue: The Best of the 2002 International Symposium on Automation and Robotics in Construction (ISARC 2002), Jan. 2004, vol. 13, No. 1, pp. 5-19.

Khoshnevis et al., Crafting Large Prototypes, IEEE Robotics & Automation Magazine, Sep. 2001, pp. 33-42.

Maeda et al., On Design of a Redundant Wire-driven Parallel Robot WARP Manipulator, Proceedings of the IEEE International Conference on Robotics & Automation, Detroit, MI, May 10-15, 1999, vol. 2, pp. 895-900.

Roth et al., An Overview of Robot Calibration, IEEE Journal of Robotics and Automation, Oct. 1987, vol. RA-3, No. 5, pp. 377-385.

Tadokoro et al., A Motion Base with 6-DOF by Parallel Cable Drive Architecture, IEE/ASME Transactions on Mechatronics, Jun. 2002, vol. 7, No. 2, pp. 115-123.

Tadokoro et al., A Portable Parallel Manipulator for Search and Rescue at Large-Scale Urban Earthquakes and an Identification Algorithm for the Installation in Unstructured Environments, Proceedings of the International Conference on Intelligent Robots and Systems, Kyongju, Korea, Oct. 17-21, 1999, vol. 2, pp. 1222-1227.

Williams II et al., 3D Cable-based Cartesian Metrology System, Journal of Robotic Systems, Wiley Periodicals, Inc., May 2004, vol. 21, No. 5, pp. 237-257.

Williams II, Cable-suspended Haptic Interface, International Journal of Virtual Reality, 1998, vol. 3, No. 3, 24 pages.

Williams II et al., Self-contained Automated Construction Deposition System, Automation in Construction, May 2004, vol. 13, Issue 3, pp. 393-407.

* cited by examiner

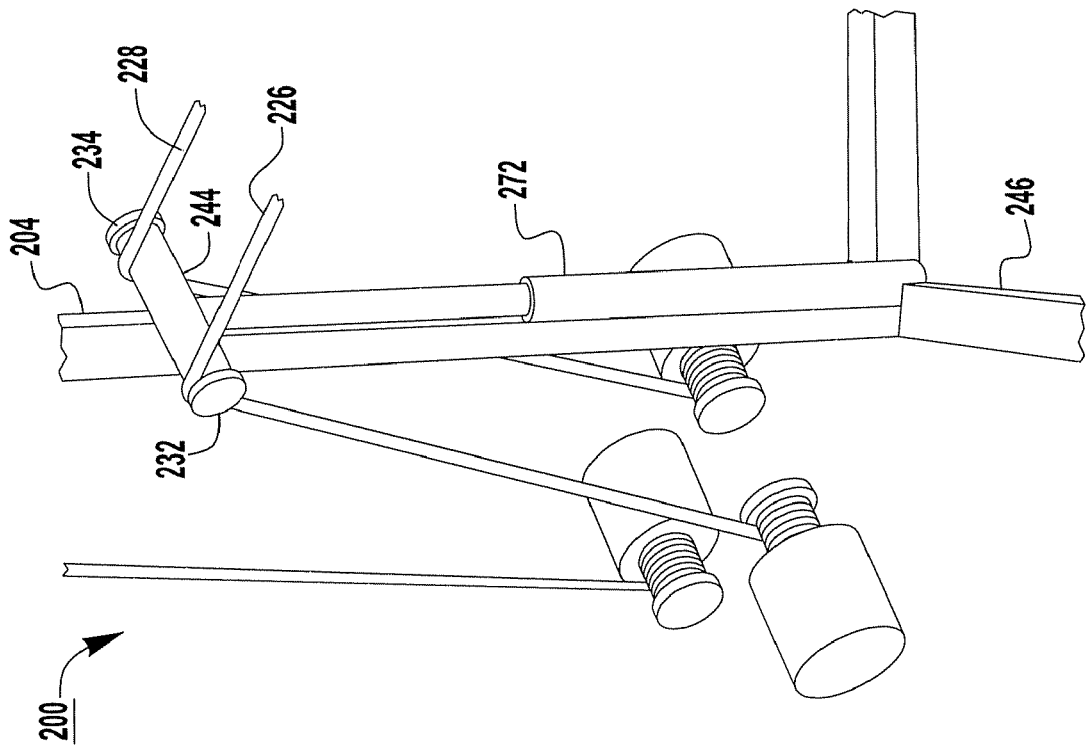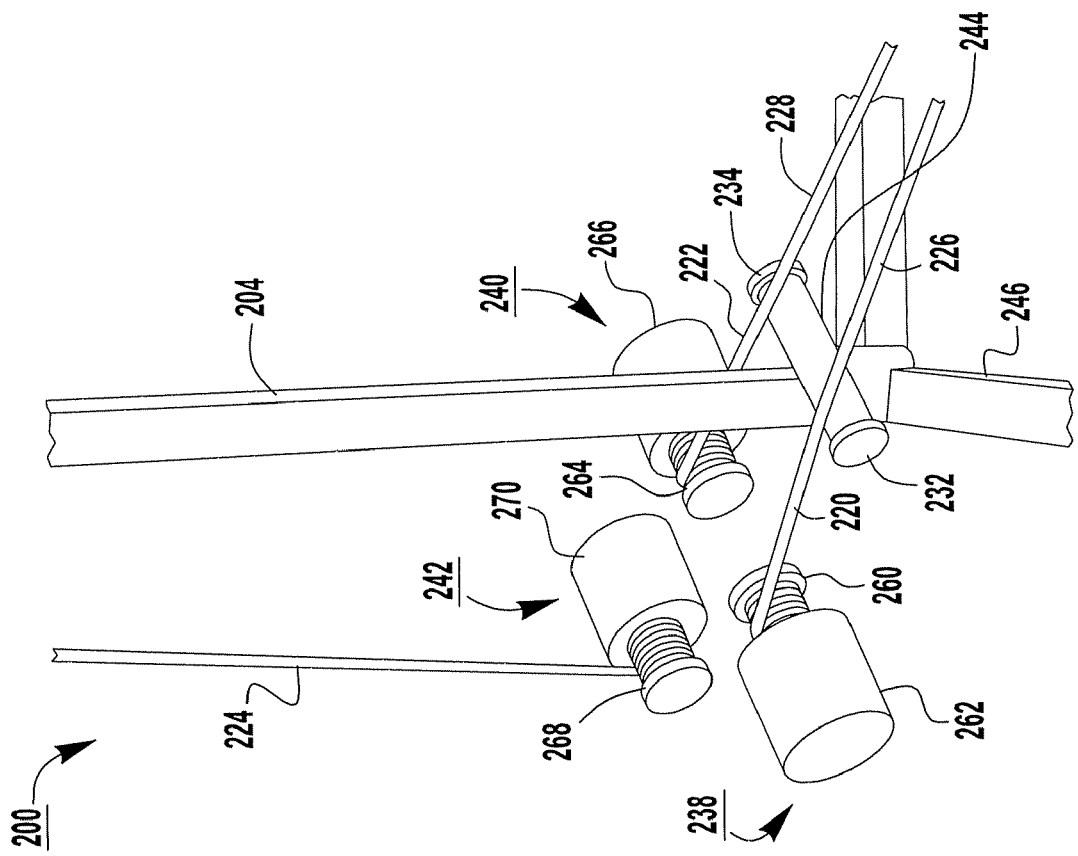

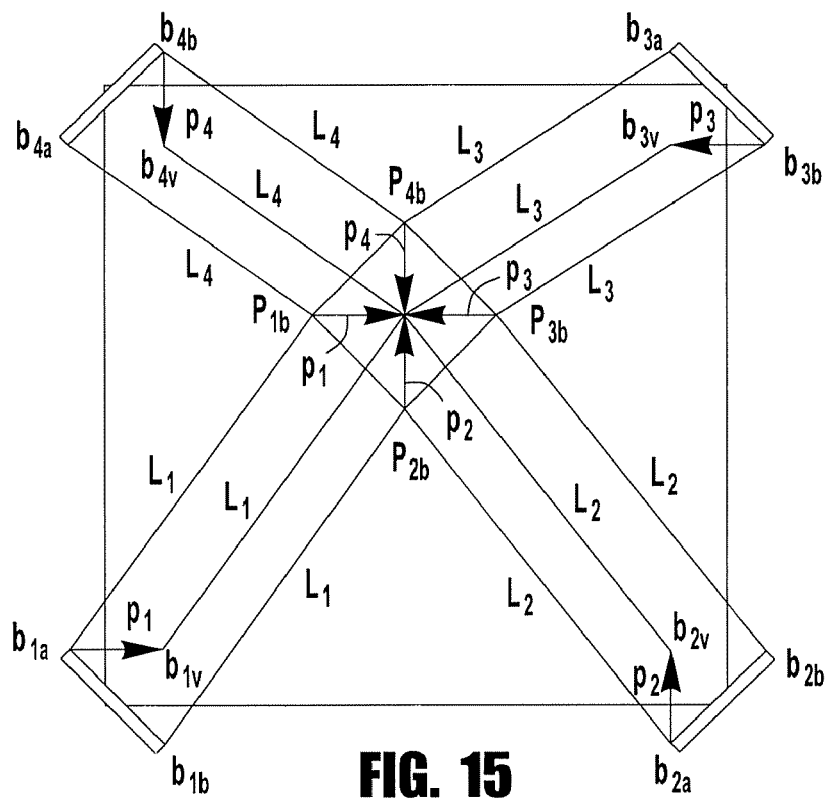
FIG. 15
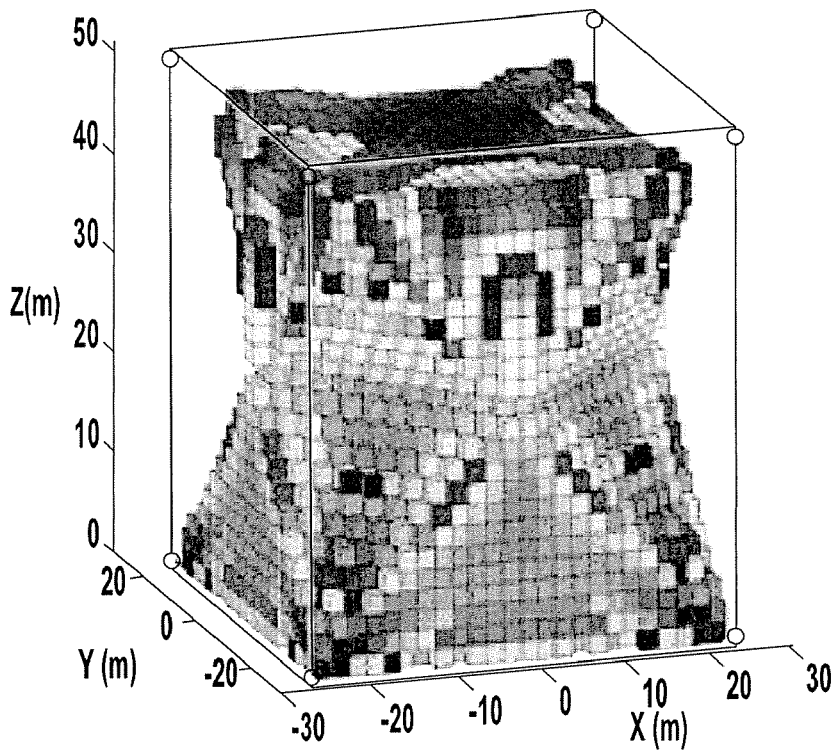
FIG. 16
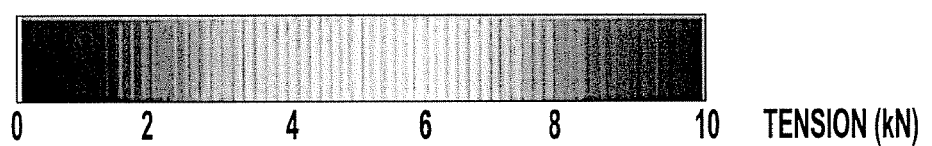
TENSION (kN)

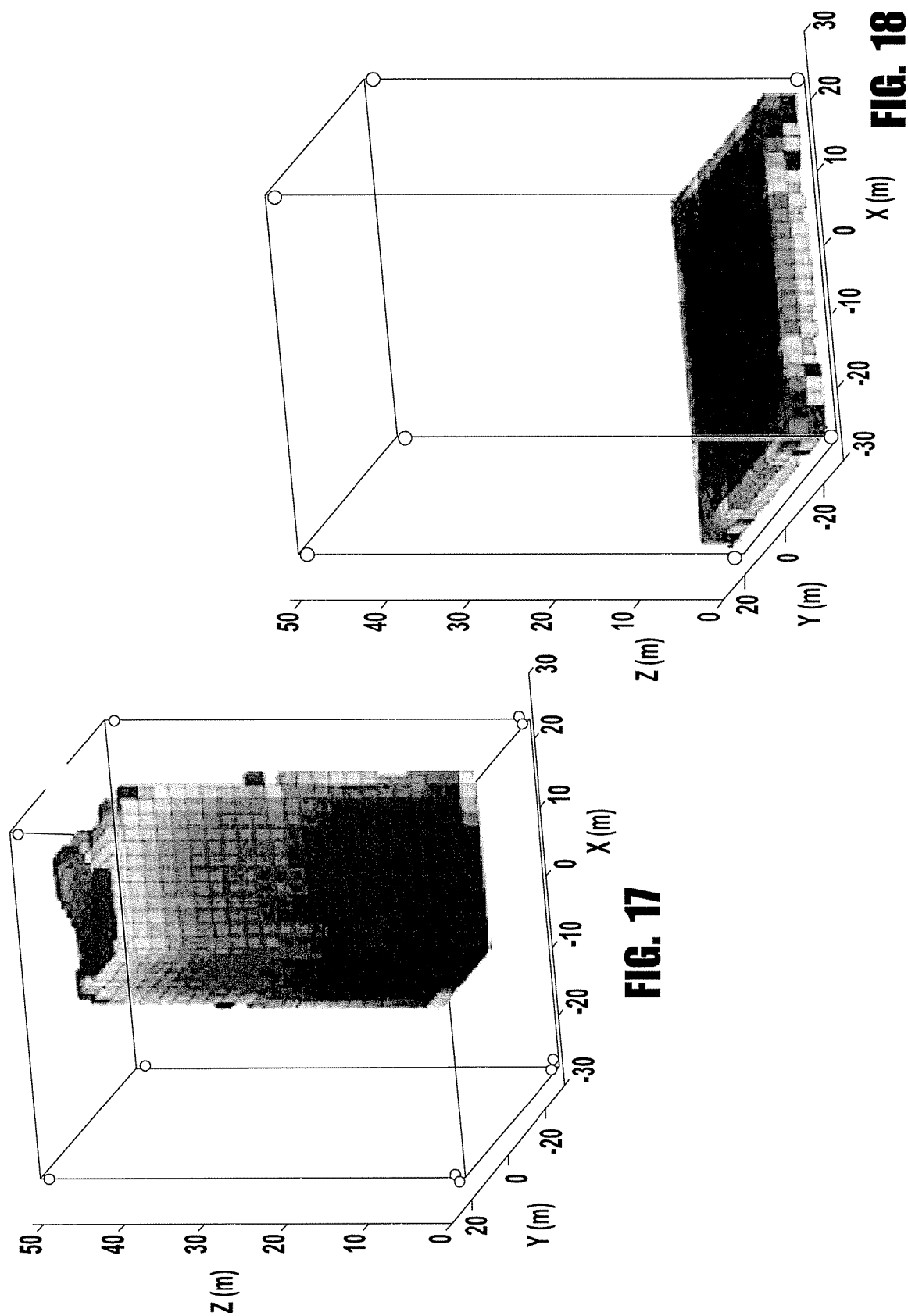

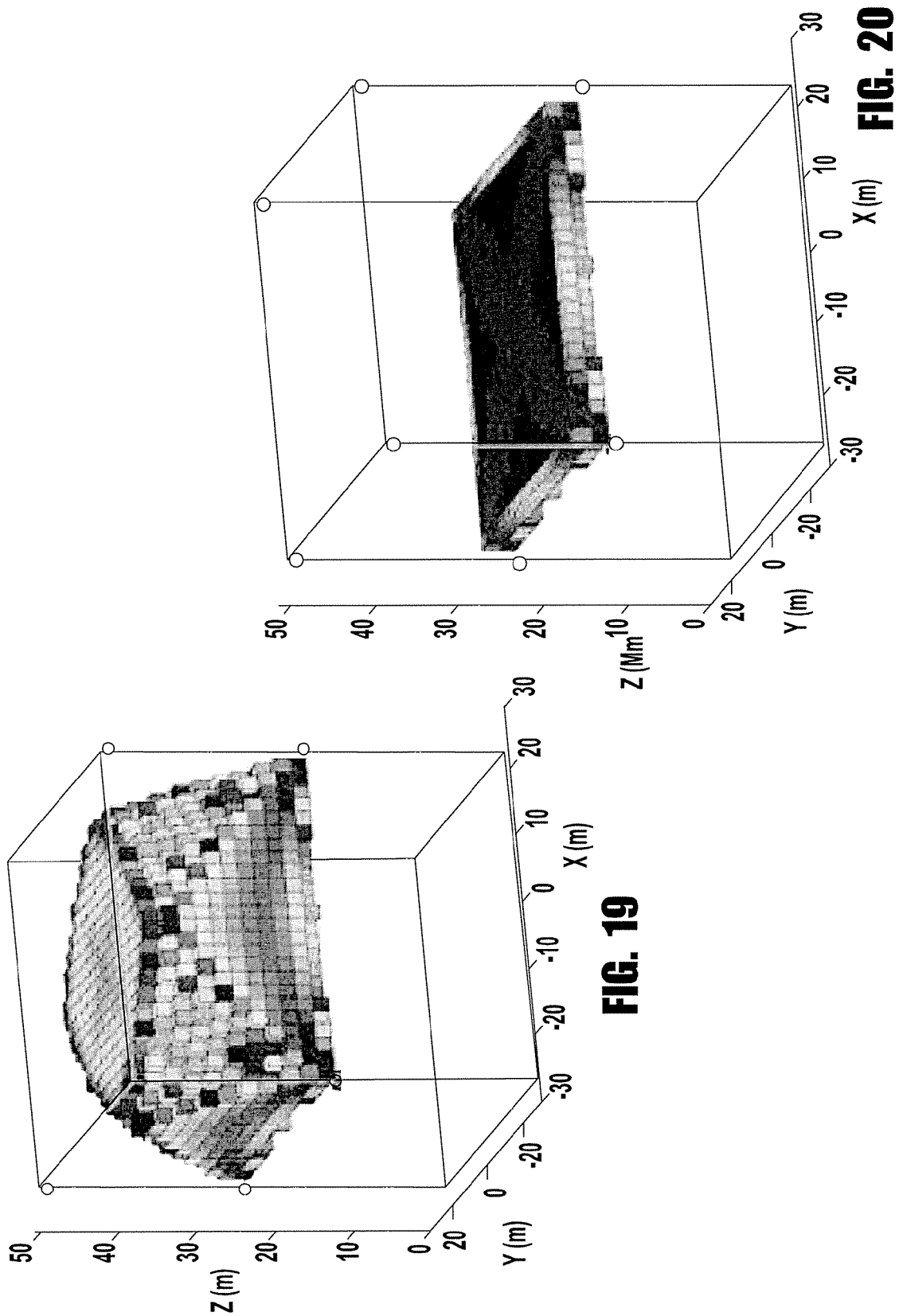

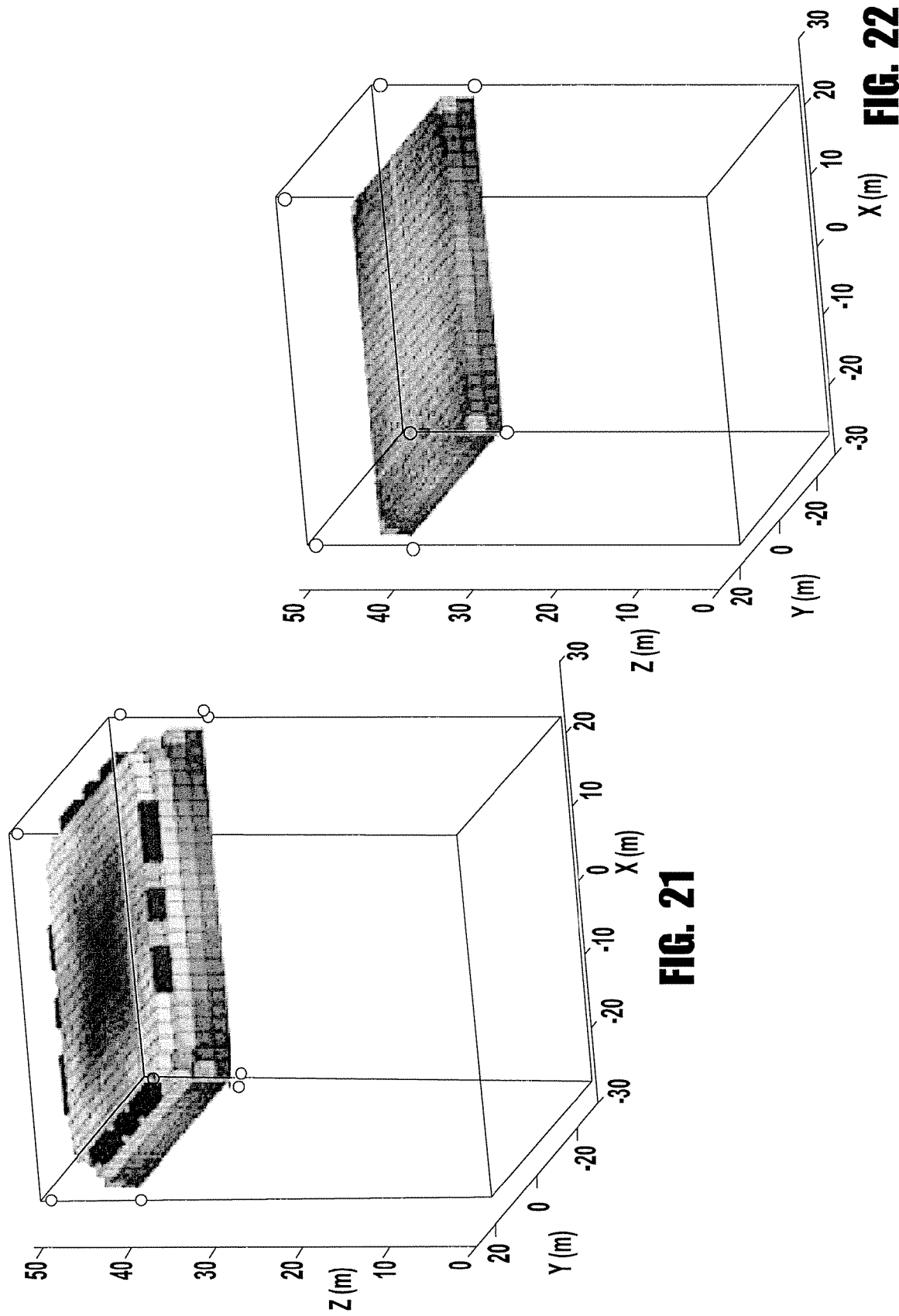

APPARATUS AND METHOD ASSOCIATED WITH CABLE ROBOT SYSTEM

BACKGROUND

Cable-driven robots (or cable-suspended robots or tendon-driven robots), referred to here as cable robots, are a type of robotic end-effector or manipulator that may be used for various manipulation tasks in a three-dimensional (3D) workspace. Cable robots have included multiple cables attached to a mobile end-effector platform that may carry one or more end-effectors (i.e., manipulators or robots) as illustrated in FIG. 1. The end-effector platform is manipulated by motors that can extend or retract the cables. Generally, cable robots are relatively inexpensive and easy to transport, disassemble and reassemble. Cable robots have been used for a variety of applications, including material handling, haptics, and many others. For examples of material handling applications, see Kawamura et al., Development of an ultrahigh speed robot FALCON using wire drive system, Proceedings of the 1993 IEEE/ICRA International Conference on Robotics and Automation, Nagoya, Japan, Vol. 1, May 1995, pp. 215-220; see also Albus et al., The NIST RoboCrane, Journal of National Institute of Standards and Technology, Vol. 97, Issue 3, May-June 1992; see also Gorman et al., The cable array robot: Theory and experiment, Proceedings of the 2001 IEEE International Conference on Robotics and Automation, 2001, pp. 2804-2810. For examples, of haptics applications, see Bonivento et al., WireMan: A portable wire manipulator for touch-rendering of bas-relief virtual surfaces, Proceedings of the 1997 International Conference on Advanced Robotics (ICAR 97), 1997, pp. 13-18; see also Williams II, Cable-suspended haptic interface, International Journal of Virtual Reality, Vol. 3, Issue 3, 1998, pp. 13-21 (Williams II-1). The contents of the Kawamura, Albus, Gorman, Bonivento, and Williams II-1 documents are fully incorporated herein by reference in their entirety.

Based on the degree to which the cables determine the pose (position and orientation) of the end-effector platform, cable robot systems can be put into two categories: fully-constrained or underconstrained. In the fully-constrained case the pose of the end-effector can be completely determined given the current lengths of the cables. FIG. 2 shows an example of a fully-constrained cable robot, the FALCON-7 (see Kawamura), a small-scale seven-cable high-speed manipulator able to achieve accelerations up to 43 g. Fully-constrained cable robots have been designed for applications that require high precision, high speed/acceleration or high stiffness. Underconstrained cable robots, for example, have been proposed for contour crafting (CC) construction practices (see Williams II et al., Self-Contained Automated Construction Deposition System, Automation in Construction, Vol. 13, 2004, pp. 393-407 (Williams II-2)). The content of the Williams II-2 document is fully incorporated herein by reference in its entirety.

Several other configurations of fully-constrained cable robots also exist (see Williams II-1; see also Maeda et al., On design of a redundant wire-driven parallel robot WARP manipulator, Proceedings of the 1999 IEEE International Conference on Robotics and Automation, Detroit, Mich., May 1999, pp. 895-900; see also Tadokoro et al., A motion base with 6-DOF by parallel cable drive architecture, IEEE/ASME Transactions on Mechatronics, Vol. 7, June 2002, pp. 115-123). However, existing fully-constrained end-effector platforms are not practical for large workspace applications because the overall geometry results in impractical cables, end-effectors, or other components. For example, implementing the FALCON-7 in FIG. 2 on a large scale would require a very large and cumbersome end-effector rod. In addition, fully-constrained cable robots often have cable interference issues, particularly with the cables colliding with nearby objects. The contents of the Maeda and Tadokoro documents are fully incorporated herein by reference in their entirety.

CC is a layered fabrication technology for automated construction of civil structures (see Khoshnevis, Automated Construction by Contour Crafting—Related Robotics and Information Technologies, Journal of Automation in Construction—Special Issue: The best of ISARC 2002, Vol. 13, Issue 1, January 2004, pp. 5-19 (Khoshnevis 1); Khoshnevis et al., Crafting Large Prototypes, IEEE Robotics & Automation Magazine, September 2001, pp. 33-42 (Khoshnevis 2)). The aim of this technology is to improve the speed, safety, quality and cost of building construction. Existing CC methods typically consist of heavy, bulky Cartesian gantry manipulators. The contents of the Khoshnevis 1 and Khoshnevis 2 documents are fully incorporated herein by reference in their entirety.

Similar to other layered fabrication technologies such as rapid prototyping, stereolithography and solid free-form fabrication, CC uses a computer controlled process to fabricate structures by depositing layers of material, building the structure from the ground up, one layer at a time. However, unlike existing layered fabrication processes, CC is designed for construction of very large scale structures, on the scale of single-family homes up to housing complexes and office buildings. FIG. 3 shows a building being constructed using CC as described in Khoshnevis 1.

The CC process involves depositing strips/beads of material (typically a thick concrete/paste type material) using an extrusion process. A nozzle (shown in FIG. 3) extrudes the material in the desired locations. In the original formulation of this system the x-y-z position of the nozzle is controlled by a Cartesian gantry manipulator. As the nozzle moves along the walls of the structure, the construction material is extruded and troweled using a set of actuated, computer controlled trowels. The use of computer-controlled trowels allows smooth and accurate surfaces to be produced. FIG. 4 shows a close-up of the extrusion/troweling tool in a small-scale prototype CC system developed by Khoshnevis (see Khoshnevis 1).

The CC process relies on manipulating the extrusion/troweling nozzle through a very large workspace. Since this manipulation primarily requires only Cartesian motion, a gantry system was used in Khoshnevis 1 to provide motion. However, in Khoshnevis 1, it is recognized that building very large structures requires an extremely large gantry robot, which may be impractical to build. Indeed, such a manipulator would be relatively large and heavy, with massive actuators. It would be impractical to transport and deploy at a construction site.

SUMMARY

In one aspect, an apparatus associated with a cable robot system is provided. In one embodiment, the apparatus includes: an end-effector platform adapted to be positioned and maneuvered within a three-dimensional (3D) workspace, at least three vertical support members adapted to be positioned outside the 3D workspace, and at least three adjustable cables adapted to be routed from each vertical support member and releasably secured to the end-effector platform to apply upward and downward tension to the end-effector platform. The adjustable cables are adapted to be adjustably extended and retracted in a coordinated fashion to maneuver the end-effector platform such that an adjustable portion of each adjustable cable spans from the corresponding vertical support member to the end-effector platform. At least two of the adjustable portions associated with each vertical support member are generally in parallel relation to each other.

DRAWINGS

These and other features, aspects, and advantages of the present invention will become better understood with regard to the accompanying drawings, following description, and appended claims.

Figure 7:
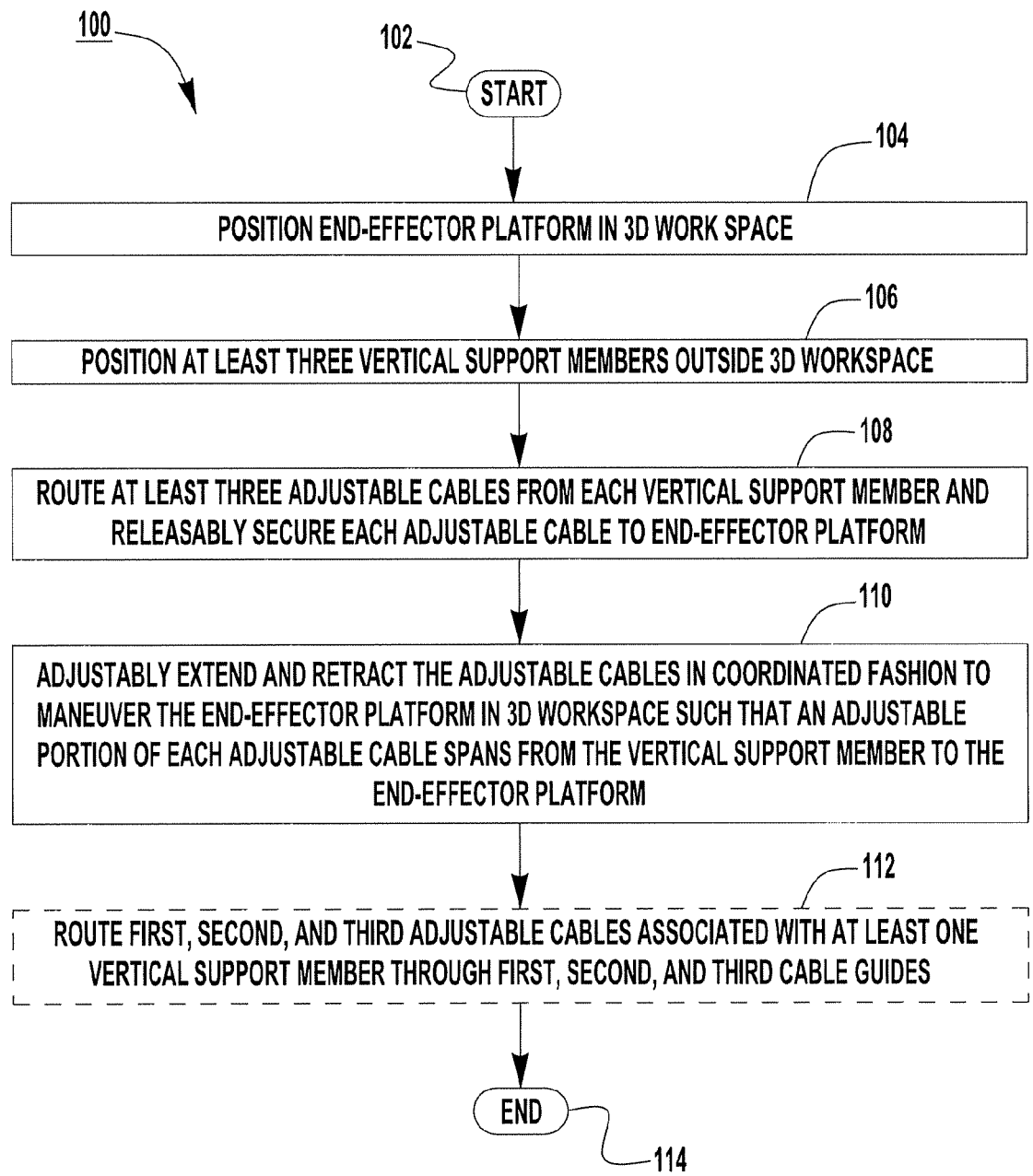
FIG. 7 is a simplified flow chart of an exemplary embodiment of a process associated with a cable robot system.
Figure 8:
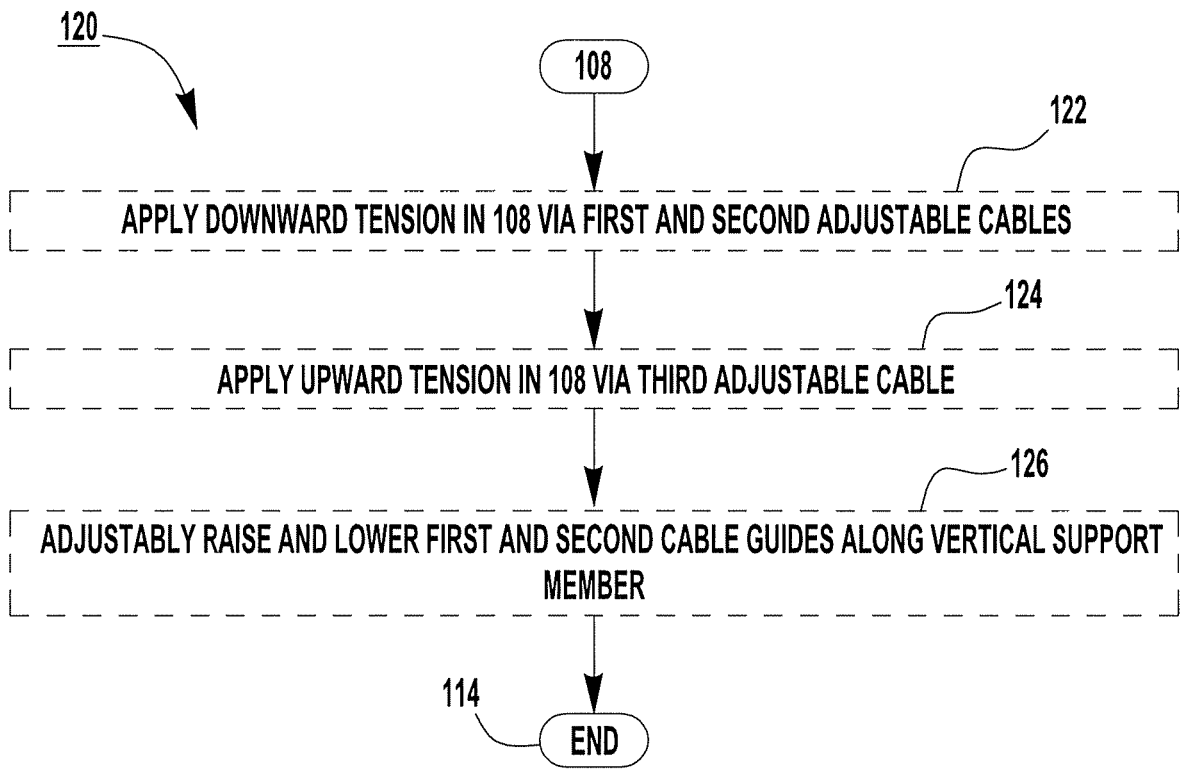

FIG. 8, in conjunction with FIG. 7, provides a simplified flow chart of another exemplary embodiment of a process associated with a cable robot system.

Figure 9:
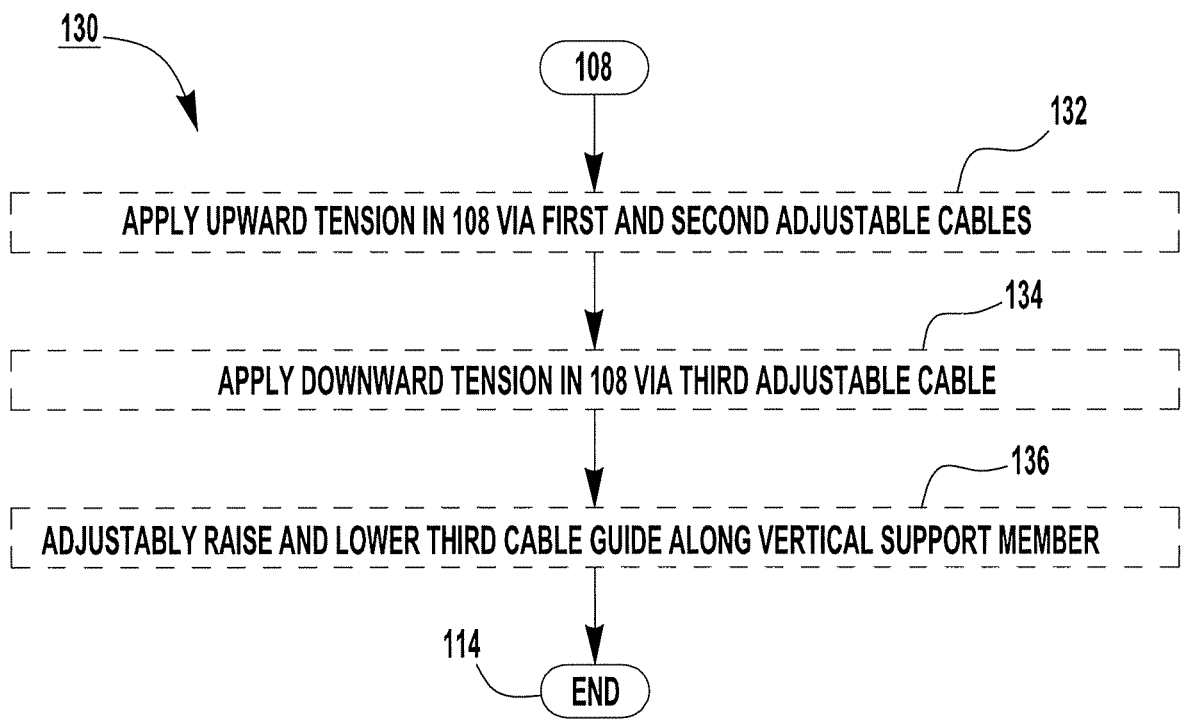

FIG. 9, in conjunction with FIG. 7, provides a simplified flow chart of yet another exemplary embodiment of a process associated with a cable robot system.

Figure 10:
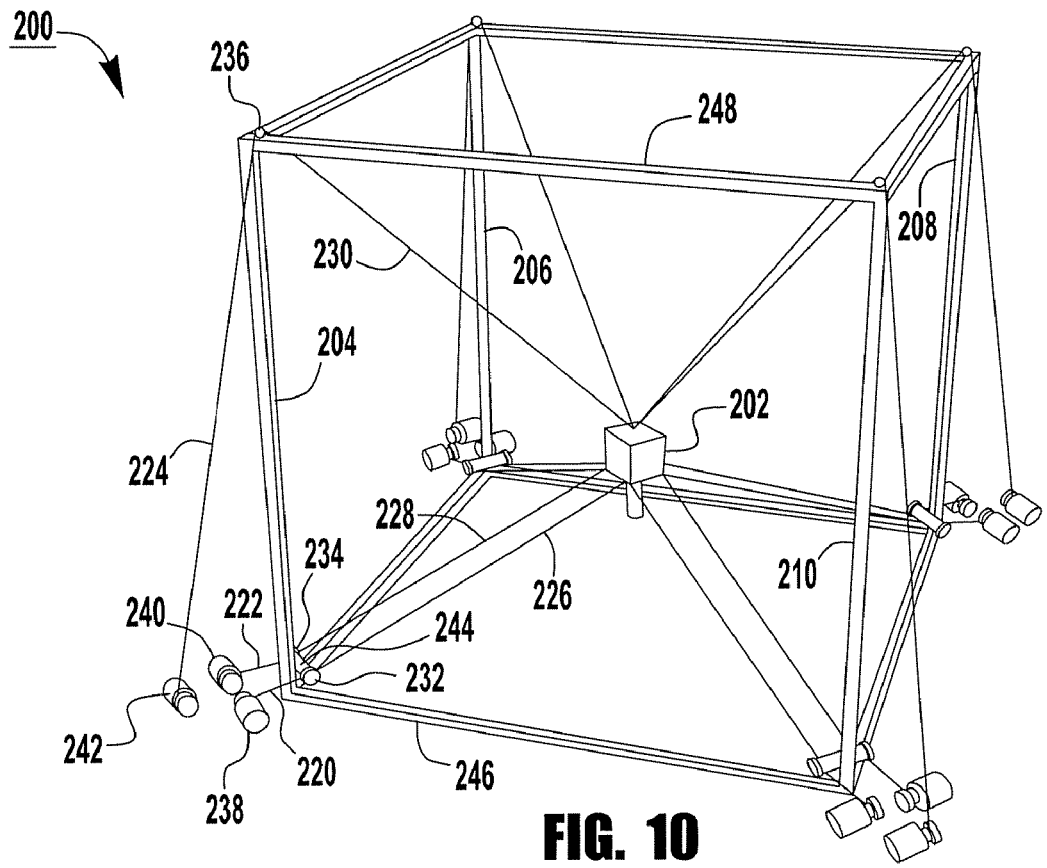

FIG. 10 is a simplified perspective view of yet another exemplary embodiment of a cable robot system.

Figure 11:
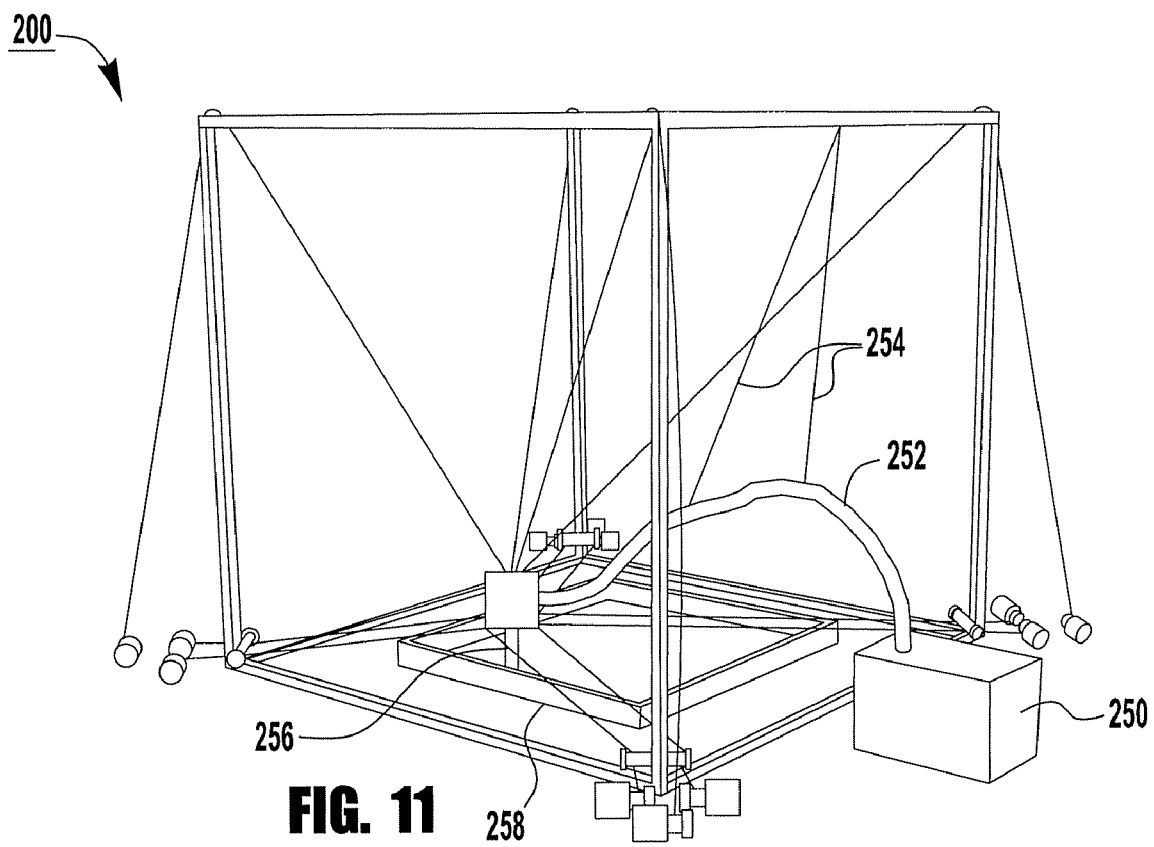

FIG. 11 is another simplified perspective view of the cable robot system of FIG. 10 being used to construct a building using CC practices.

FIG. 12A is a simplified perspective view of a lower corner portion of the cable robot system of FIG. 10.

FIG. 12B is a simplified perspective view of a lower corner portion of another embodiment of a cable robot system.

Figure 13:
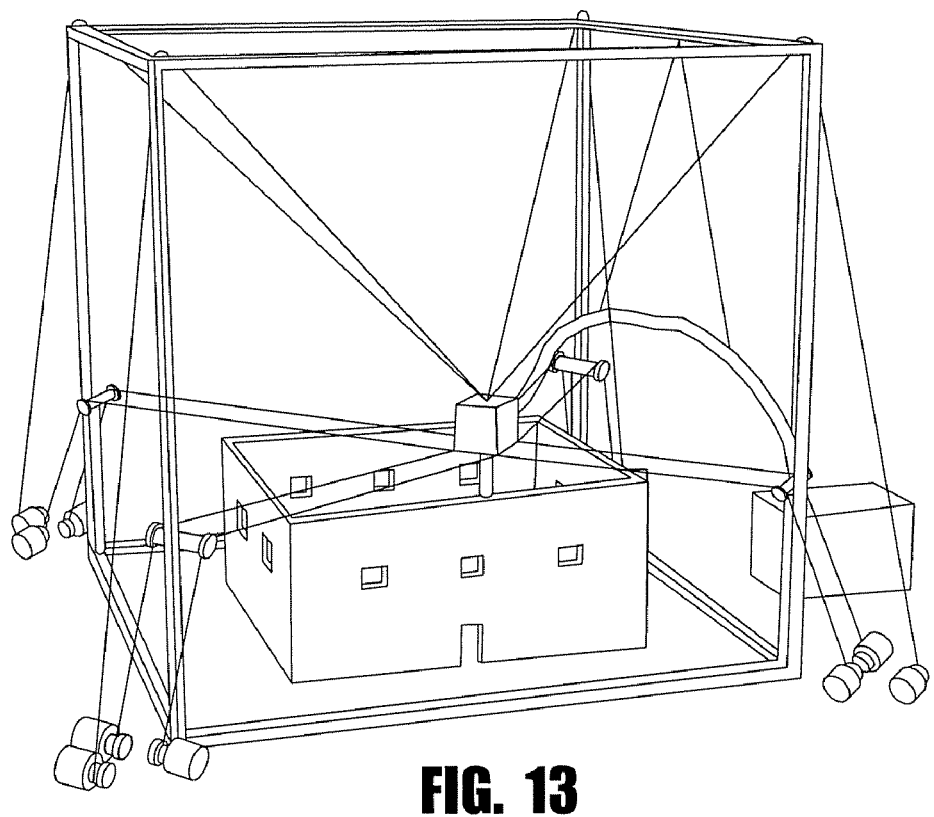

FIG. 13 is another simplified perspective view of the cable robot system of FIG. 12B being used to construct a building using CC practices.

Figure 14:
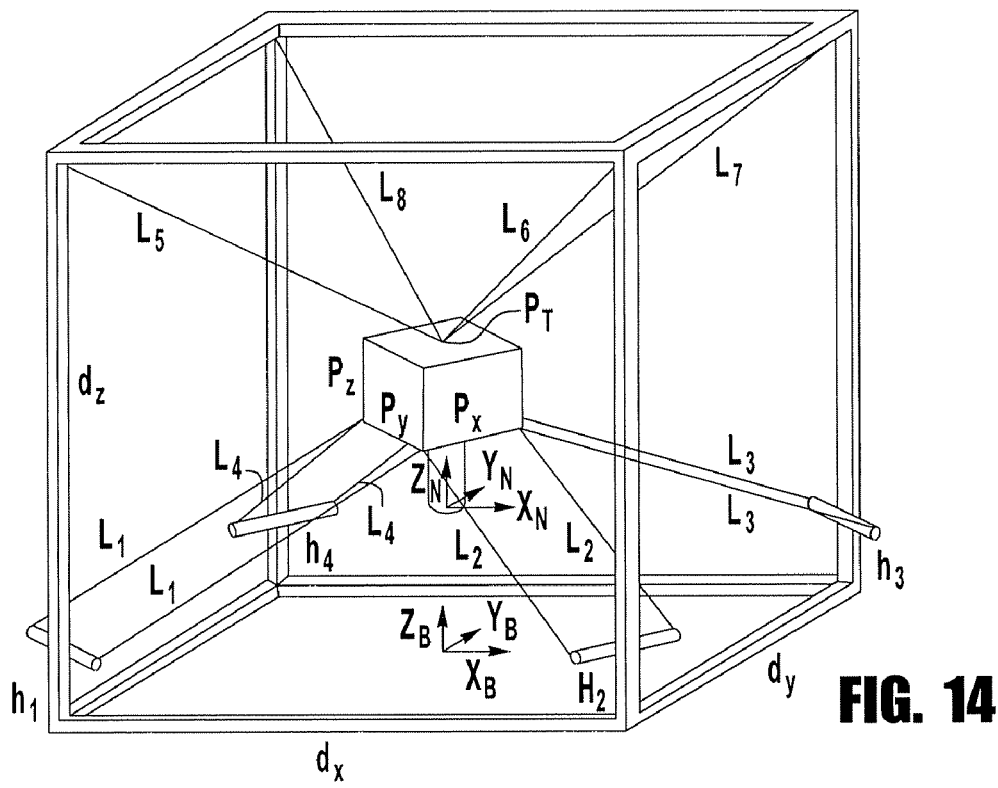

FIG. 14 is a simplified perspective view of an exemplary embodiment of a cable robot system showing kinematic parameters associated therewith.

FIG. 15 is a simplified overhead view of the cable robot system of FIG. 14 showing additional kinematic parameters associated therewith.

FIG. 16 is a volumetric three-dimensional (3D) graph showing an effective workspace of an exemplary embodiment of a cable robot system where cables applying downward tension are at a low elevation.

FIG. 17 is a volumetric 3D graph showing a quarter section of the effective workspace depicted in FIG. 16.

FIG. 18 is a volumetric 3D graph showing a lower section of the effective workspace depicted in FIG. 16.

FIG. 19 is a volumetric 3D graph showing an effective workspace of an exemplary embodiment of a cable robot system where cables applying downward tension are at a midrange elevation.

FIG. 20 is a volumetric 3D graph showing a lower section of the effective workspace depicted in FIG. 19.

FIG. 21 is a volumetric 3D graph showing an effective workspace of an exemplary embodiment of a cable robot system where cables applying downward tension are at a high elevation.

FIG. 22 is a volumetric 3D graph showing a lower section of the effective workspace depicted in FIG. 21.

Figure 23:
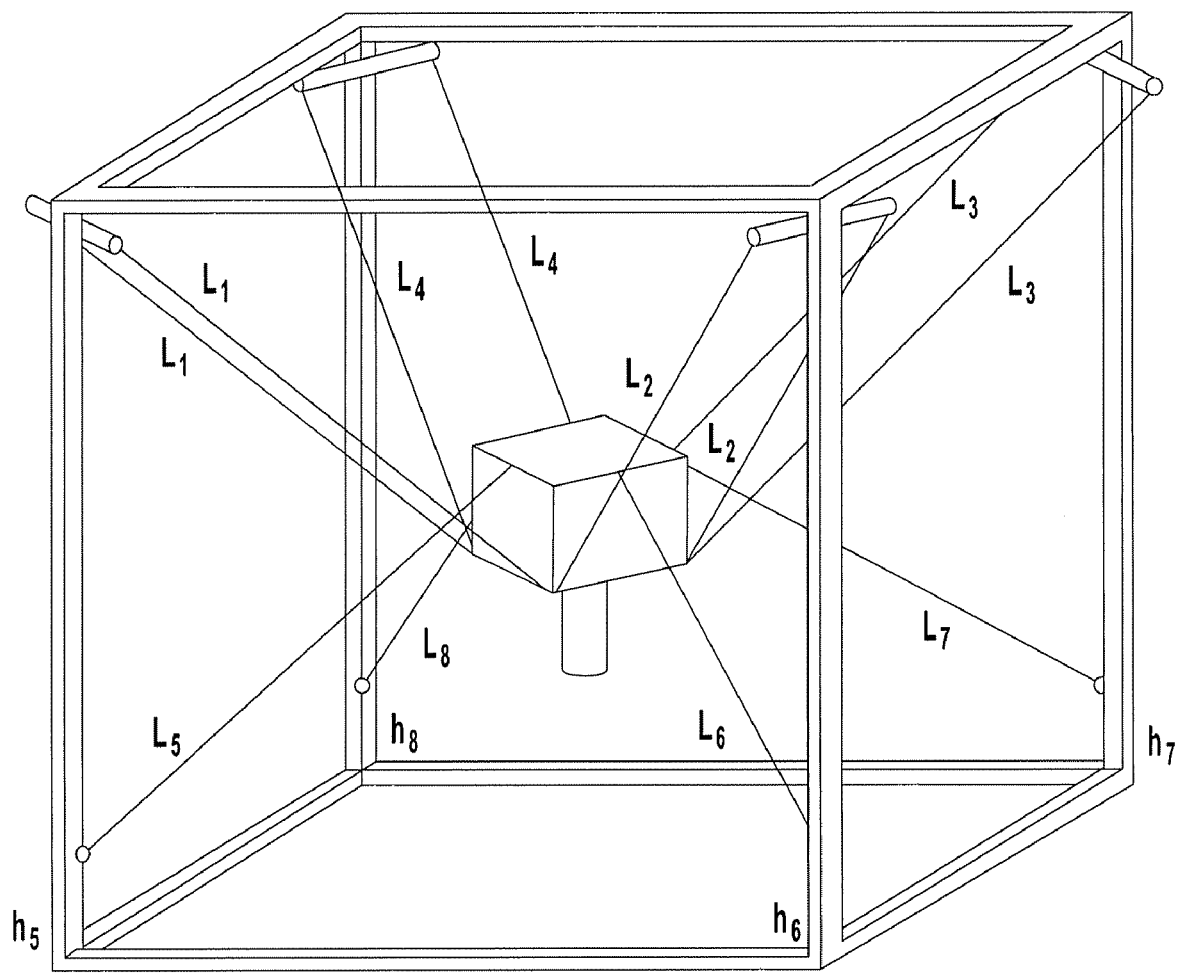

FIG. 23 is a simplified perspective view of still another exemplary embodiment of a cable robot system.

DESCRIPTION

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or another programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more delineated elements or method steps.

"Computer communication," as used herein includes, but is not limited to, a communication between two or more computer components and can be, for example, a network transfer, a file transfer, an applet transfer, an e-mail, a hyper-text transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer component," as used herein includes, but is not limited to, a computer-related entity, either hardware, firmware, software, a combination thereof, or software in execution. For example, a computer component can be, but is not limited to being, a processor, an object, an executable, a process running on a processor, a thread of execution, a program and a computer. By way of illustration, both an application running on a server and the server can be computer components. One or more computer components can reside within a process or thread of execution and a computer component can be localized on one computer or distributed between two or more computers.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Operable connection" (or a connection by which entities are "operably connected"), as used herein includes, but is not limited to, a connection in which signals, physical communication flow, or logical communication flow may be sent or received. Usually, an operable connection includes a physical interface, an electrical interface, or a data interface, but an operable connection may include differing combinations of these or other types of connections sufficient to allow operable control.

"Operative communication," as used herein includes, but is not limited to, a communicative relationship between devices, logic, or circuits, including mechanical and pneumatic relationships. Direct and indirect electrical, electromagnetic, and optical connections are examples of connections that facilitate operative communications. Linkages, gears, chains, belts, push rods, cams, keys, attaching hardware, and other components contributing to mechanical relations between items are examples of components facilitating operative communications. Pneumatic devices and interconnecting pneumatic tubing may also contribute to operative communications. Two devices are in operative communication if an action from one causes an effect in the other, regardless of whether the action is modified by some other device. For example, two devices in operable communication may be separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) IEEE 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or' is used to describe a list of alternative things in which one may choose one option or any combination of alternative options. For example, "A or B" means "A or B or both" and "A, B, or C" means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combinations of alternatives are not included in the choices associated with the list.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or another electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

"Software component," as used herein includes, but is not limited to, a collection of one or more computer readable or executable instructions that cause a computer or other electronic device to perform functions, actions or behave in a desired manner. The instructions may be embodied in various forms like routines, algorithms, modules, methods, threads, or programs. Software components may be implemented in a variety of executable or loadable forms including, but not limited to, a stand-alone program, a servelet, an applet, instructions stored in a memory, and the like. Software components can be embodied in a single computer component or can be distributed between computer components.

The following table includes long form definitions of exemplary acronyms, abbreviations, and labels for variables and constants in mathematical or logical expressions used within this disclosure. Except where noted otherwise, variants of all acronyms, including singular forms, plural forms, and other affixed forms, fall within each exemplary acronym meaning. Except where noted otherwise, capitalized and non-capitalized forms of all acronyms fall within each meaning.

| Acronym | Long Form |
| --- | --- |
| 3D | Three-dimensional |
| ASIC | Application specific integrated circuit |
| ASME | American Society of Mechanical Engineers |
| BLOB | Binary large object |
| $C^4$ | Contour crafting Cartesian cable |
| CC | Contour crafting |
| CG | Center of gravity |
| CIE | Computers and Information in Engineering |
| CPU | Central processing unit |
| DETC | Design Engineering Technical Conference |
| DOF | Degrees of freedom |
| DSP | Digital signal processor |
| EPROM | Erasable programmable read-only memory |
| HTTP | Hypertext transfer protocol |
| ICAR | International Conference on Advanced Robotics |
| ICRA | International Conference on Robotics and Automation |
| IEEE | Institute of Electrical and Electronics Engineers |
| ISARC | International Symposium on Automation and Robotics in Construction |
| LAN | Local area network |

-continued

| Acronym | Long Form |
| --- | --- |
| k | Kilo |
| m | Meter |
| N | Newton |
| NIST | National Institute of Standards and Technology |
| PROM | Programmable read-only memory |
| RAM | Random access memory |
| ROM | Read-only memory |
| WAN | Wide area network |

Figure 1:
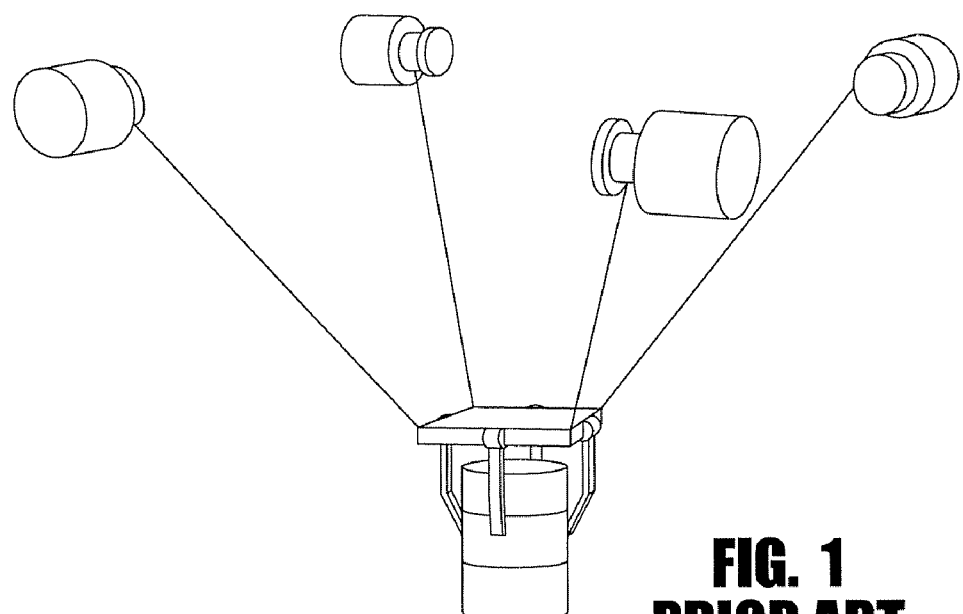
FIG. 1 is a simplified drawing of an existing cable robot system.
Figure 2:
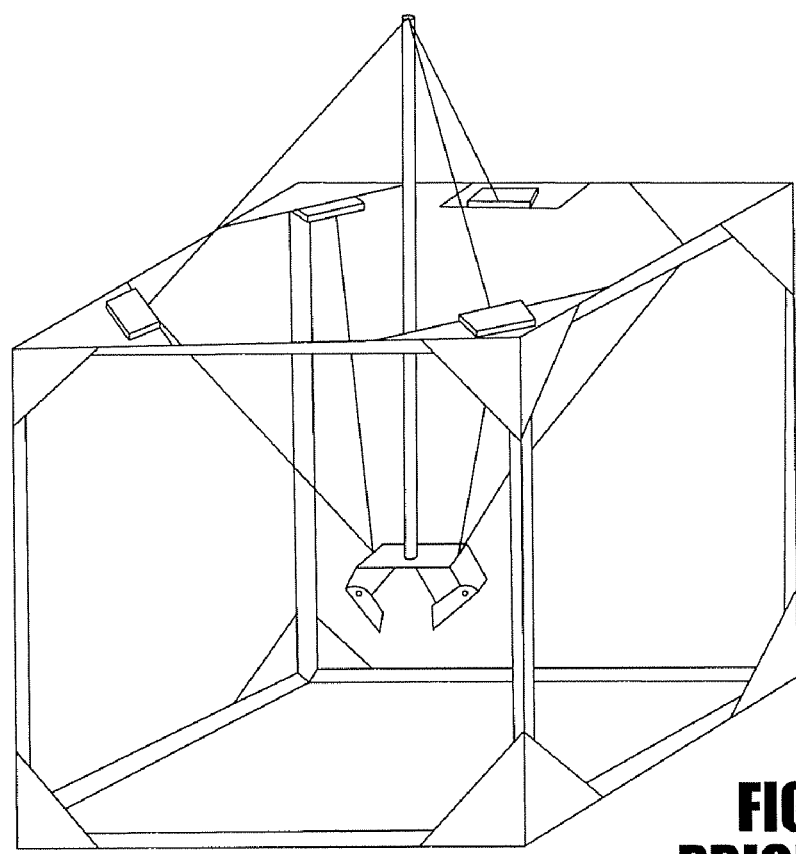
FIG. 2 is a drawing of an existing cable robot system known as FALCON-7.
Figure 3:
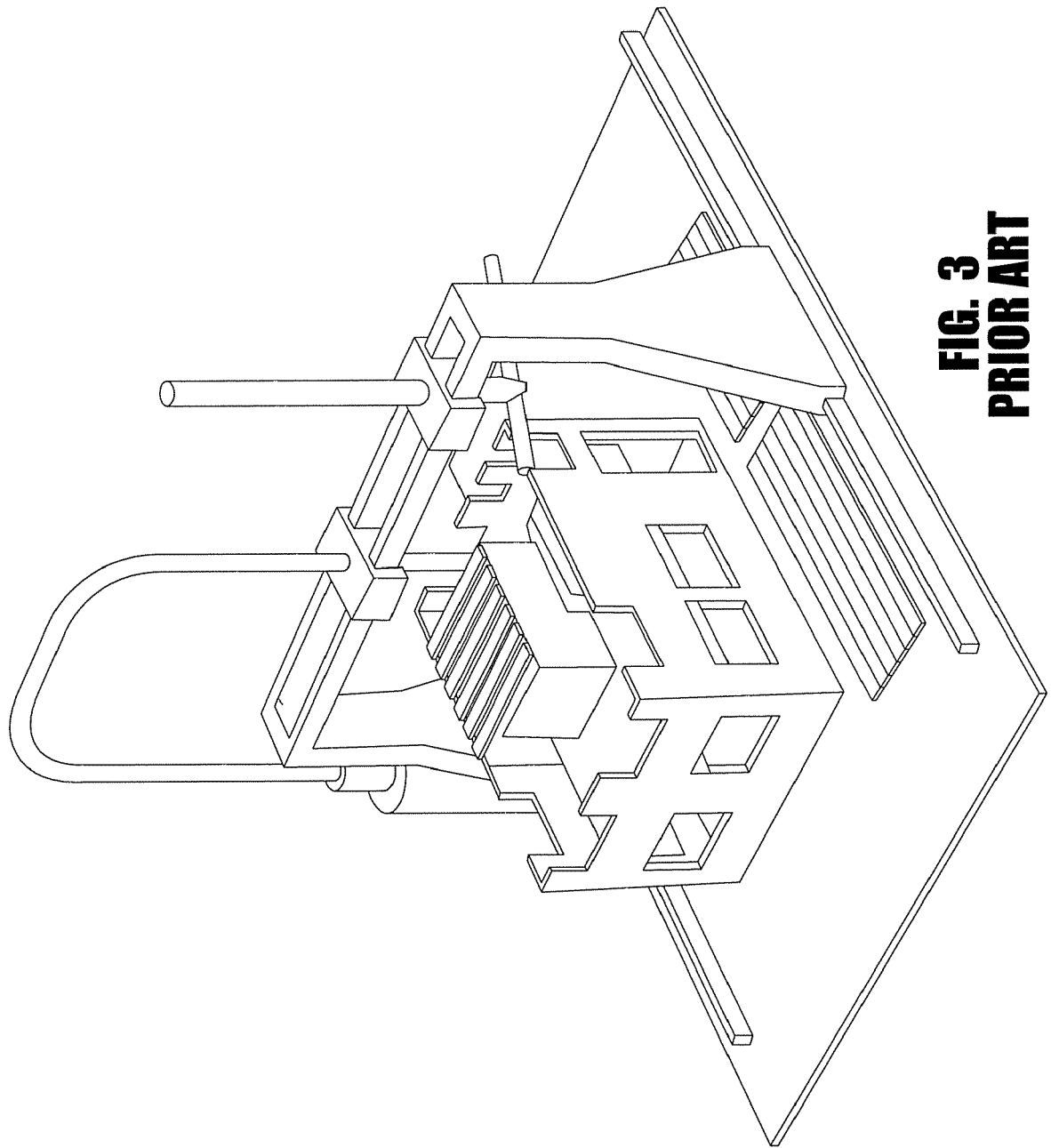
FIG. 3 is a drawing of an existing gantry system being used to construct a building using contour crafting (CC) practices.
Figure 4:
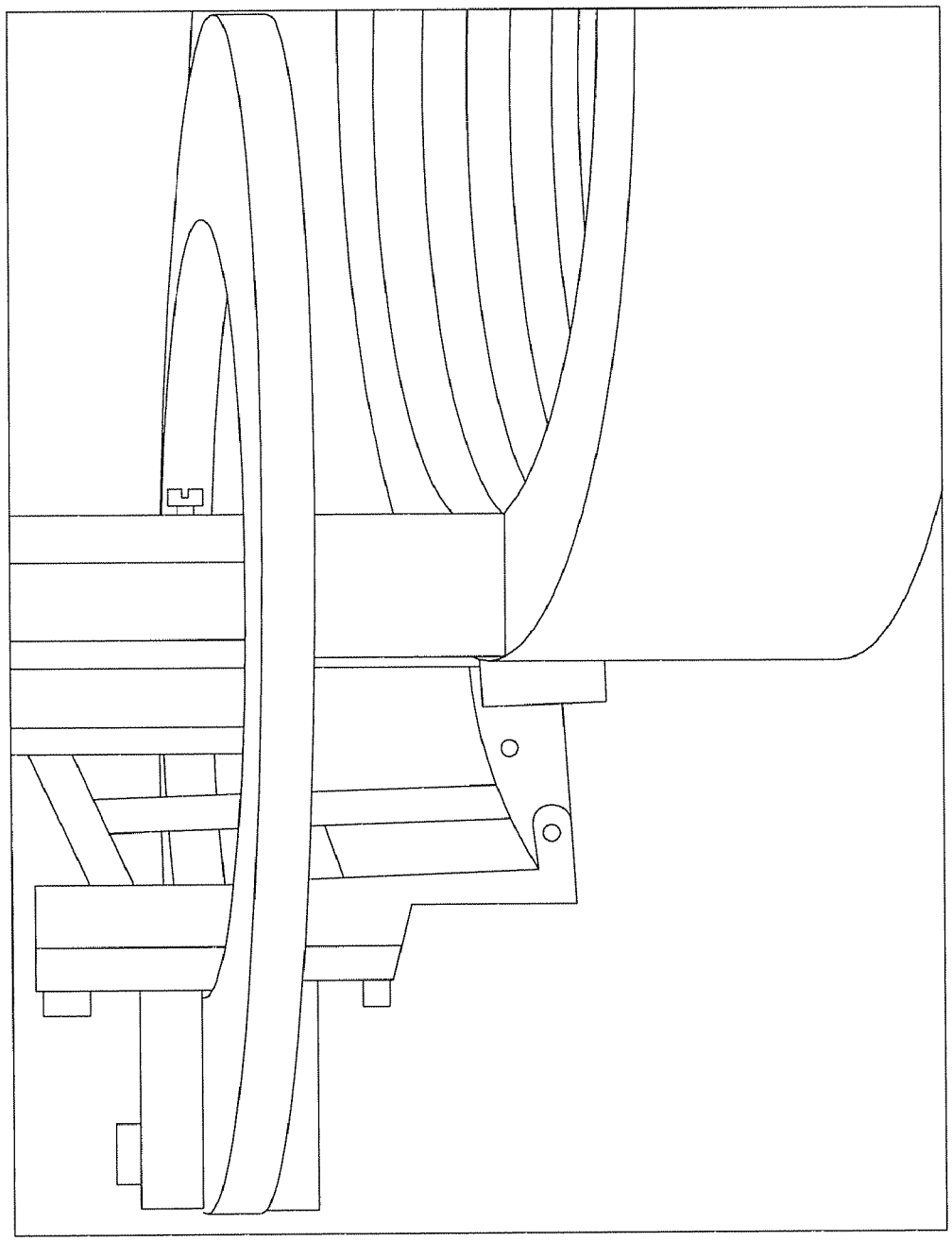
FIG. 4 is a drawing of an existing end effector being used to construct a concrete structure using CC practices.
Figure 5:
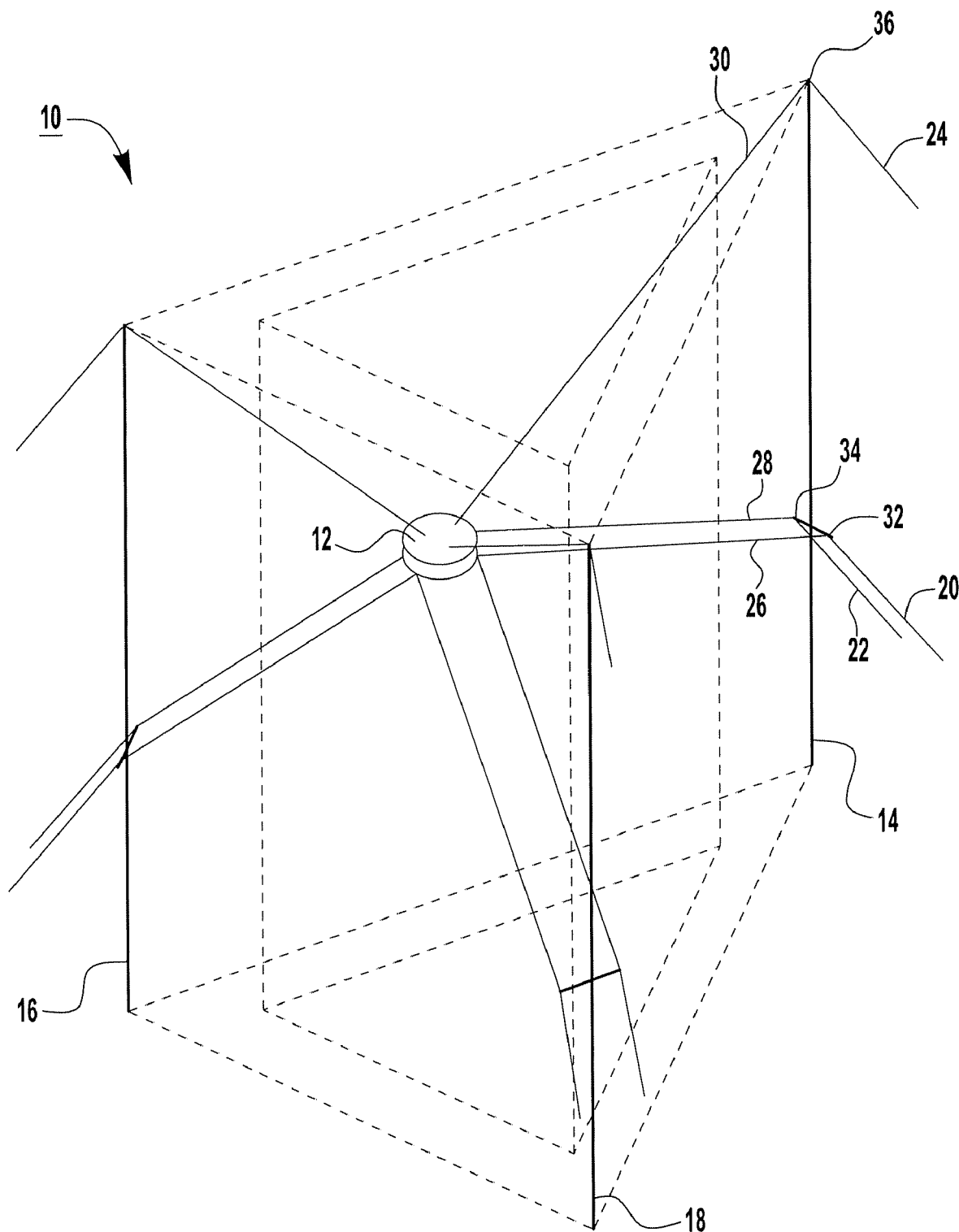
FIG. 5 is a simplified perspective view of an exemplary embodiment of an apparatus associated with a cable robot system.

With reference to FIG. 5, an exemplary embodiment of a cable robot system 10 may include an end-effector platform 12, three vertical support members 14, 16, 18, and three adjustable cables 20, 22, 24 associated with each vertical support member 14, 16, 18. In other embodiments, the cable robot system 10 may include one or more additional vertical support members. Similarly, in other embodiments, one or more additional adjustable cables may be associated with any individual vertical support member 14, 16, or 18, any combination of vertical support members, or all vertical support members.

As shown, the end-effector platform 12 may be positioned within a 3D workspace and the three vertical support members 14, 16, 18 may be positioned outside the 3D workspace. Each set of three adjustable cables 20, 22, 24 may be routed from a corresponding vertical support member 14, 16, or 18 and releasably secured to the end-effector platform 12 in a manner that applies upward and downward tension to the end-effector platform within the 3D workspace. The adjustable cables 20, 22, 24 may be adjustably extended and retracted in a coordinated fashion to maneuver the end-effector platform 12 within the 3D workspace such that an adjustable portion 26, 28, or 30 of each adjustable cable 20, 22, 24 spans from the corresponding vertical support member 14, 16, or 18 to the end-effector platform 12. As shown, the first and second adjustable portions 26, 28 associated with each vertical support member 14, 16, 18 may be generally in parallel relation to each other. In other embodiments, additional adjustable portions may be generally in parallel relation to each other or to one or more of the three adjustable portions 26, 28, or 30.

Each adjustable cable 20, 22, 24 may be adjustably extended, for example, from a cable reel (not shown) or the like and retracted back on the cable reel. For example, three cable reels (not shown) may be associated with each set of three adjustable cables 20, 22, 24. Each cable reel (not shown), for example, may be individually controlled by a motor (not shown) or the like either directly (e.g., via a common shaft (not shown) or the like) or indirectly (e.g., via a gearbox (not shown) or the like). In another embodiment, the cable reels (not shown) associated with the first and second adjustable cables 20, 22 may be controlled by a common motor (not shown) directly or indirectly. In still another embodiment, the cable reels (not shown) associated with the three adjustable cables 20, 22, 24 may be controlled by a common motor (not shown) and a suitable interface to differentially drive the cable reel associated with the third adjustable cable 24 in relation to driving the cable reels associated with the first and second adjustable cables 20, 22.

The motors (not shown) may be networked for controlling the extending and retracting of the adjustable cables to maneuver the end-effector platform 12 within the 3D workspace in a coordinated fashion. In one embodiment, a centralized controller (not shown) may be in operative communication with each motor to provided coordinated control. The centralized controller (not shown) may maneuver the end-effector platform 12 in response to operator controls (not shown) and end-effector platform position control algorithms (not shown). Alternatively or additionally, the centralized controller (not shown) may maneuver the end-effector platform 12 in an automated or semi-automated fashion in response to a pre-programmed route (not shown) or a pre-programmed destination (not shown) based on position control algorithms (not shown). The centralized controller may include any suitable controller, including any suitable combination of a CPU, processor, microprocessor, computer, software, firmware, and any combination over various common peripheral devices or components associated with such items. Similarly, any controller associated with an individual motor or group of motors may include any suitable controller, including any suitable combination of a CPU, processor, microprocessor, computer, software, firmware, and any combination over various common peripheral devices or components associated with such items.

As shown, the first and second adjustable portions 26, 28 that are in parallel relation to each other may form opposite sides of an adaptive parallelogram. The other sides of the parallelogram being defined by connecting the ends of the first and second adjustable portions 26, 28 at the corresponding vertical support member 14, 16, or 18 and at the end-effector platform 12. The adjustable cables 20, 22, 24 may be routed from the corresponding vertical support members 14, 16, 18 and releasably secured to the end-effector platform 12 in a manner that generally limits rotation of the end-effector platform 12. In additional embodiments, one or more vertical support members 14, 16, or 18 may include first, second, and third cable guides 32, 34, 36 for respectively routing the corresponding adjustable cables 20, 22, 26 associated with the corresponding vertical support member 14, 16, or 18. Each cable guide 32, 34, 36, for example, may include a pulley or any suitable type of cable guide. In one embodiment, the first and second cable guides 32, 34, associated with the corresponding adjustable cables 20, 22 that have adjustable portions 26, 28 in parallel relation to each other, may be horizontally spaced from each other.

As shown, the first and second adjustable cables 20, 22 may apply downward tension to the end-effector platform 12 and the third adjustable cable 24 may apply upward tension. In this arrangement, the first and second cable guides 32, 34 may be adjustably raised and lowered along the corresponding vertical support member 14, 16, or 18. The raising and lowering of the first and second cable guides 32, 34, for example, may be to avoid objects within the 3D workspace such as natural or artificial objects, including an artificial object under construction using the cable robot system 10. Control of the raising and lowering of the first and second cable guides 32, 34 may be coordinated with control of the extending and retracting of the adjustable cables 20, 22, 24 as the end-effector platform 12 is maneuvered within the 3D workspace.

In another embodiment (not shown), the first and second adjustable cables 20, 22 may apply upward tension to the end-effector platform 12 and the third adjustable cable 24 may apply downward tension. In this embodiment, the first and second cable guides 32, 34 are positioned near an upper end of the corresponding vertical support member 14, 16, or 18 and the third cable guide 36 is positioned lower. In this arrangement, the third cable guide 36 may be adjustably raised and lowered along the corresponding vertical support member 14, 16, or 18. The raising and lowering of the third cable guide 36, for example, may be to avoid natural or artificial objects within the 3D workspace. Control of the raising and lowering of the third cable guide 36 may be coordinated with control of the extending and retracting of the adjustable cables 20, 22, 24 as the end-effector platform 12 is maneuvered within the 3D workspace.

As shown, the three vertical support members 14, 16, 18 may be spaced around the outside of the 3D workspace in a triangular footprint. In one embodiment, the three vertical support members 14, 16, 18 may be generally proportionately spaced so that the triangular footprint generally forms an equilateral triangle. In another embodiment, the three vertical support members 14, 16, 18 may be generally spaced so that the triangular footprint generally forms an isosceles triangle. In yet another embodiment, the three vertical support members 14, 16, 18 may be generally spaced so that the triangular footprint generally forms a right triangle. In other embodiments, the three vertical support members 14, 16, 18 may be generally spaced so that the triangular footprint generally forms any type of three-sided polygon, including a scalene triangle, an acute triangle, or an obtuse triangle. As shown, the shape of the triangular footprint formed by the three vertical support members 14, 16, 18 defines the shape of the 3D workspace. Conversely, if the footprint dimension of a desired 3D workspace is known, the three vertical support members 14, 16, 18 can be positioned outside the desired 3D workspace in a manner that minimizes the footprint for the cable robot system 10.

Of course, if the desired 3D workspace is generally triangular, a cable robot system 10 with three vertical support members 14, 16, 18 may be preferred. However, if the desired 3D workspace is not triangular, additional vertical support members may be used in the cable robot system 10 based on the general geometric footprint of the desired 3D workspace. For example, a cable robot system with four vertical support members may be preferred if the footprint dimension of the desired 3D workspace is generally square or rectangular. Similarly, five vertical support members may be preferred if the footprint dimension of the desired 3D workspace is generally shaped like a pentagon.

It is understood that the cable robot system 10 may be transported in a disassembled configuration, set up in relation to a desired 3D workspace, and used, for example, in conjunction with construction of an artificial object within the desired 3D workspace. Upon completion of the construction, the cable robot system may be disassembled and reused at another location. For example, the cable robot system 10 may be used to pour concrete or to perform other construction tasks using contour crafting (CC) practices. The cable robot system 10 may also be used like a crane. In other embodiments, the vertical support members 14, 16, 18 may be interconnected with upper, lower, or cross members to form a structural framework around the 3D workspace. Very large 3D workspaces can be accommodated simply by strengthening the structural framework for the cable robot system 10. For example, it is envisioned that the cable robot system 10 could be used in conjunction with construction of a high-rise building, a sports area, or a stadium.

Figure 6:
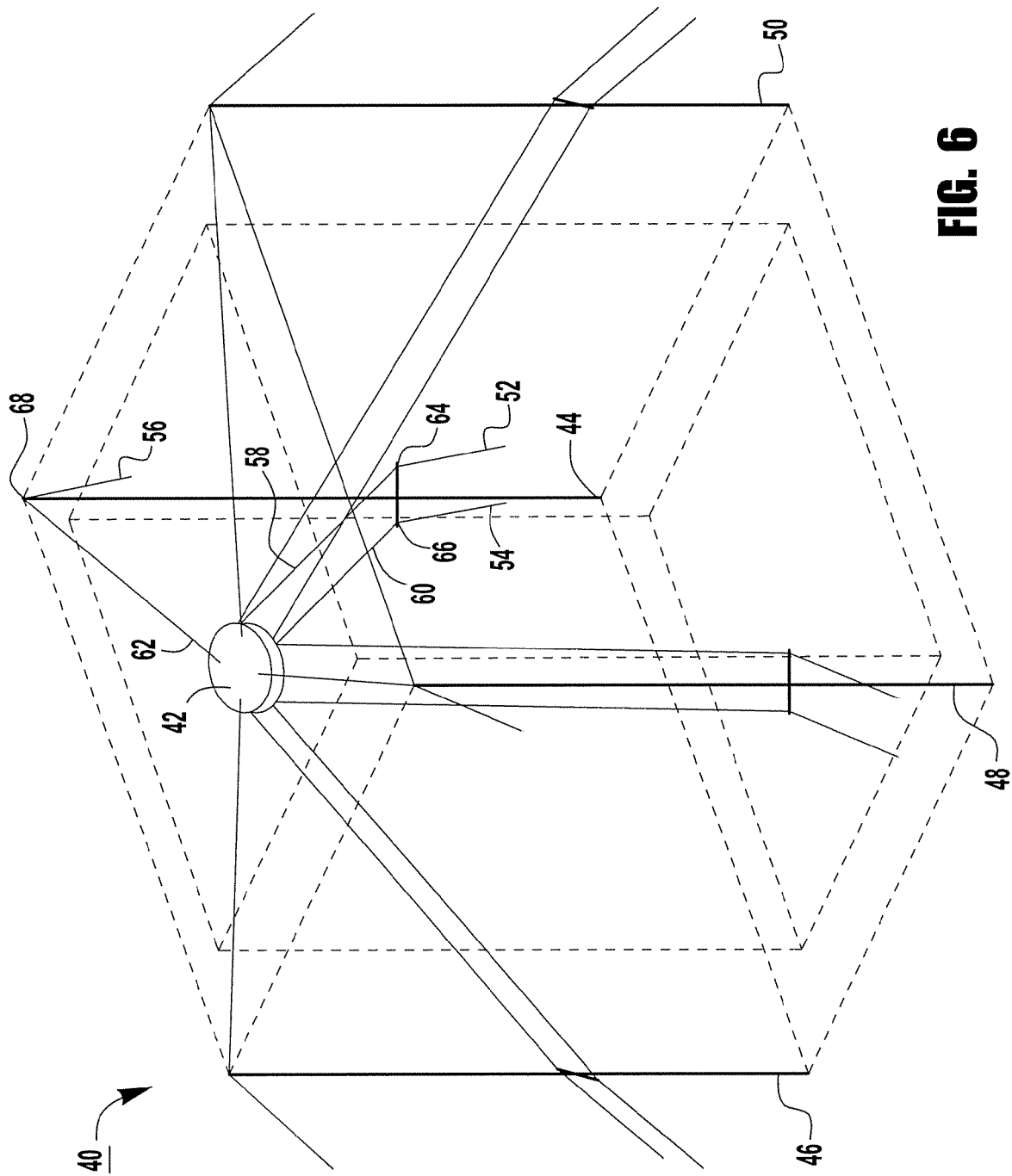
FIG. 6 is a simplified perspective view of another exemplary embodiment of an apparatus associated with a cable robot system.

With reference to FIG. 6, another exemplary embodiment of a cable robot system 40 may include an end-effector platform 42, four vertical support members 44, 46, 48, 50, and three adjustable cables 52, 54, 56 associated with each vertical support member 44, 46, 48, 50. In other embodiments, the cable robot system 40 may include one or more additional vertical support members. Similarly, in other embodiments, one or more additional adjustable cables may be associated with any individual vertical support member 44, 46, 48, or 50, any combination of vertical support members, or all vertical support members.

As shown, the end-effector platform 42 may be positioned within a 3D workspace and the four vertical support members 44, 46, 48, 50 may be positioned outside the 3D workspace. Each set of three adjustable cables 52, 54, 56 may be routed from a corresponding vertical support member 44, 46, 48, or 50 and releasably secured to the end-effector platform 42 in a manner that applies upward and downward tension to the end-effector platform within the 3D workspace. The adjustable cables 52, 54, 56 may be adjustably extended and retracted in a coordinated fashion to maneuver the end-effector platform 42 within the 3D workspace such that an adjustable portion 58, 60, or 62 of each adjustable cable 52, 54, 56 spans from the corresponding vertical support member 44, 46, 48, or 50 to the end-effector platform 42. As shown, the first and second adjustable portions 58, 60 associated with each vertical support member 44, 46, 48, 50 may be generally in parallel relation to each other. In other embodiments, additional adjustable portions may be generally in parallel relation to each other or to one or more of the three adjustable portions 58, 60, or 62.

As shown, the first and second adjustable portions 58, 60 that are in parallel relation to each other may form opposite sides of an adaptive parallelogram. The other sides of the parallelogram being defined by connecting the ends of the first and second adjustable portions 58, 60 at the corresponding vertical support member 44, 46, 48, or 50 and at the end-effector platform 42. The adjustable cables 52, 54, 56 may be routed from the corresponding vertical support members 44, 46, 48, 50 and releasably secured to the end-effector platform 42 in a manner that generally limits rotation of the end-effector platform 42. Each vertical support member 44, 46, 48, 50 may include first, second, and third cable guides 64, 66, 68 for respectively routing the corresponding adjustable cables 52, 54, 56 associated with the corresponding vertical support member 44, 46, 48, or 50. Each cable guide 64, 66, 68, for example, may include a pulley or any suitable type of cable guide. In one embodiment, the first and second cable guides 64, 66, associated with the corresponding adjustable cables 42, 44 that have adjustable portions 58, 60 in parallel relation to each other, may be horizontally spaced from each other.

As shown, the first and second adjustable cables 52, 54 may apply downward tension to the end-effector platform 42 and the third adjustable cable 56 may apply upward tension. In this arrangement, the first and second cable guides 64, 66 may be adjustably raised and lowered along the corresponding vertical support member 44, 46, 48, or 50. In another embodiment (not shown), the first and second adjustable cables 52, 54 may apply upward tension to the end-effector platform 42 and the third adjustable cable 56 may apply downward tension. In this embodiment, the first and second cable guides 64, 66 are positioned near an upper end of the corresponding vertical support member 44, 46, 48, or 50 and the third cable guide 68 is positioned lower. In this arrangement, the third cable guide 68 may be adjustably raised and lowered along the corresponding vertical support member 44, 46, 48, or 50. Extending and retracting the adjustable cables 52, 54, 56, maneuvering the end-effector platform 42, raising and lowering the first and second cable guides 64, 66, or raising and lowering the third cable guide 68 may be provided in the same manner as described above with reference to the various embodiments of the cable robot system 10 of FIG. 5.

As shown, the four vertical support members 44, 46, 48, 50 may be spaced around the outside of the 3D workspace in a rectangular footprint. In one embodiment, the four vertical support members 44, 46, 48, 50 may be generally proportionately spaced so that the rectangular footprint generally forms a square. In another embodiment, the four vertical support members 44, 46, 48, 50 may be generally spaced so that the footprint generally forms any type of four-sided polygon.

With reference to FIG. 7, an exemplary embodiment of a process 100 associated with a cable robot system starts at 102. Next, an end-effector platform may be positioned within a 3D workspace (104). At 106, at least three vertical support members may be positioned outside the 3D workspace. Next, at least three adjustable cables may be routed from each vertical support member and releasably secured to the end-effector platform in a manner that applies upward and downward tension to the end-effector platform (108). At 110, the adjustable cables may be adjustably extended and retracted in a coordinated fashion to maneuver the end-effector platform within the 3D workspace such that an adjustable portion of each adjustable cable spans from the corresponding vertical support member to the end-effector platform. At least two of the adjustable portions associated with each vertical support member may be generally in parallel relation to each other during the extending and retracting. With 112 being optional, as shown by the dashed lines, the process may continue the maneuvering associated with 110 until, for example, performance of a construction task is either complete or to a desired stopping point where the process is ended by advancing to 114.

In one embodiment, the two adjustable portions in parallel relation to each other may form opposite sides of an adaptive parallelogram in conjunction with the extending and retracting in 110. In another embodiment, the routing and securing in 108 may be performed in a manner that generally limits rotation of the end-effector platform in conjunction with the extending and retracting in 110. In still another embodiment, the routing and securing in 108 may include respectively routing first, second, and third adjustable cables of the at least three adjustable cables associated with at least one vertical support member through first, second, and third cable guides associated with the at least one vertical support member (112). Again, the process may continue the maneuvering associated with 110 until, for example, performance of a construction task is either complete or to a desired stopping point where the process is ended by advancing to 114.

In yet another embodiment, the first and second cable guides may be horizontally spaced from each other. In this embodiment, the first and second adjustable cables associated with the first and second cable guides may be the adjustable cables associated with the at least one vertical support member that have adjustable portions in parallel relation to each other. In still another embodiment, the vertical support members positioned in 106 may be spaced around the outside of the 3D workspace in a generally proportional manner.

With respect to FIGS. 7 and 8, another exemplary embodiment of a process 120 associated with a cable robot system may include 102-108 of FIG. 7. Next, at least a portion of the downward tension in 108 may be applied via the corresponding first and second adjustable cables (122). At 124, at least a portion of the upward tension in 108 may be applied via the corresponding third adjustable cable. Next, the first and second cable guides may be adjustably raised and lowered along the corresponding vertical support member (126). Like the process 100 of FIG. 7, the process 120 may continue the maneuvering associated with 110 until, for example, performance of a construction task is either complete or to a desired stopping point where the process is ended by advancing to 114.

With respect to FIGS. 7 and 9, another exemplary embodiment of a process 130 associated with a cable robot system may include 102-108 of FIG. 7. Next, at least a portion of the upward tension in 108 may be applied via the first and second adjustable cables (132). At 134, at least a portion of the downward tension in 108 may be applied via the corresponding third adjustable cable. Next, the third cable guide may be adjustably raised and lowered along the corresponding vertical support member (136). Like the process 100 of FIG. 7, the process 130 may continue the maneuvering associated with 110 until, for example, performance of a construction task is either complete or to a desired stopping point where the process is ended by advancing to 114.

This disclosure describes various embodiments of a cable robot system that can be used, for example, to perform CC operations. The cable robot system can generally provide translation-only manipulation of an end-effector platform through a 3D workspace. However, only in the idealized sense can true translation-only motion be achieved. In real-world implementation, non-ideal behavior (such as cable sag and stretch, imperfect motor control, small dimensional errors in the end-effector and frame structures) will result in small rotations of the end-effector. Of course, this is also the case for any other "translation-only" mechanism. Thus, manipulation of the end-effector platform is referred to as providing generally translation-only motion because a small amount of rotation is allowable. The intent is to produce motion of the end-effector that is very nearly translation-only motion (within a small rotational tolerance). The acceptable rotational tolerance may depend on the application for which the manipulator is used. For example, it could be as much as a few degrees of rotation (about any arbitrary axis), or as little as fractions of a degree of rotation. The rotational accuracy that can be attained may be limited by the precision of the components used to construct the manipulator.

The cable robot system can be relatively light weight, portable, and can be operated in a relatively large 3D workspace. The cable robot system may also be used for other types of manipulation tasks that may be performed using generally translation-only motion of the end-effector platform, particularly for tasks requiring large 3D workspaces. In relation to cable robot systems, the contents of U.S. Pat. Nos. 4,883,184, 6,566,834, and 7,088,071 are fully incorporated herein by reference in their entirety. In relation to CC, the contents of U.S. Pat. Nos. 4,749,347, 5,529,471, and 5,656,230 are fully incorporated herein by reference in their entirety.

With reference to FIG. 10, an embodiment of a CC Cartesian cable ($C^4$) robot system 200 may include an end-effector platform 202, four vertical support members 204, 206, 208, 210, and two parallel lower cables 220, 222 and an upper cable 224 associated with each vertical support member. Each upper and lower cable 220, 222, 224 may be retained on a corresponding reel associated with a motor 238, 240, 242, routed through a corresponding pulley 232, 234, 236, and releasably attached to the end-effector platform 202. An adjustable portion 226, 228, 230 of each cable 220, 222, 224 may span from the corresponding pulley 232, 234, 236 to the end-effector platform 202. Each vertical support member 204, 206, 208, 210 may include a horizontal crossbar 244 on which the lower pulleys 232, 234 may be secured. The $C^4$ robot system 200 may also include four lower horizontal members 246 and four upper horizontal members 248 attached to opposing end portions of the vertical support members 204, 206, 208, 210.

The $C^4$ robot system 200 may provide translation-only manipulation of the end-effector platform 202 carrying an extrusion/construction end-effector through a relatively large 3D workspaces for CC tasks. As shown in FIG. 10, the end-effector platform 202 may be maneuvered within the rigid frame 204, 206, 208, 210, 246, 248 using twelve cables 220, 222, 224. The twelve cables 220, 222, 224 may be grouped into four upper cables 224 and eight lower cables 220, 222. The eight lower cables 220, 222 may be divided into four pairs of parallel cables 220, 222. The arrangement of the parallel cables 220, 222 may be related to a previous cable robot system developed by the inventors (see Bosscher et al., A concept for rapidly-deployable cable robot search and rescue systems, Proceedings of the 2005 ASME DETC/CIE Conferences, Long Beach, Calif., DETC2005-84324, September 2005 (Bosscher 1)) for generally translation-only motion. The content of the Bosscher 1 document is fully incorporated herein by reference in its entirety.

The cables 220, 222, 224 may be routed through pulleys 232, 234, 236 to motors 238, 240, 242 that actuate or adjust the lengths of the cables. The pulleys 232, 234, 236 may be mounted to the rigid frame 204, 206, 208, 210, 246, 248. The motors 238, 240, 242 can be located at the base of the rigid frame 204, 206, 208, 210, 246, 248. The rigid frame 204, 206, 208, 210, 246, 248 may include truss-like members, such as vertical support members 204, 206, 208, 210, lower horizontal member 246, and upper horizontal members 248, that can be easily transported in a disassembled configuration and assembled at a construction site or any other type of work site. Generally, the rigid frame 204, 206, 208, 210, 246, 248 can be designed to be large enough and strong enough to enclose, for example, any structure to be built at a construction site.

The pulleys 232, 234 for the lower cables 220, 222 may be mounted on horizontal crossbars 244. The horizontal crossbars 244 may be oriented at a 45° angle with respect to adjacent upper and lower horizontal members 246, 248. The footprint of the end-effector platform 202 may be generally the same shape as the footprint defined by the of the rigid frame 246. As shown, the footprints for the end-effector platform 202 and the rigid frame 246 are generally square. In the embodiment being described, the length of each horizontal crossbar 244 may be generally the same as the length of a corresponding side on the end-effector platform 202. Additionally, the horizontal crossbar 244 and the corresponding side on the end-effector platform 202 may be generally in parallel relation to each other. Similarly, the distance between the pulleys 232, 234 on the horizontal crossbar 244 and the distance between releasable cable attachments associated therewith on the end-effector platform 202 may be generally the same.

In other embodiments, the shape of the footprint of the end-effector platform 202 may be different from the footprint of the rigid frame 246. For example, the footprint of the end-effector platform 202 may be generally circular for a rigid frame 246 with a square, rectangular, or triangular footprint. The location and distance between releasable cable attachments on an end-effector platform 200 with a circular footprint may adjusted so that the distance between pulleys on a corresponding horizontal crossbar 244 and the distance between associated releasable cable attachments are generally the same and so that a general parallel relationship between the horizontal crossbar 244 and the corresponding releasable cable attachments is provided.

The end-effector platform 202 may include extrusion and troweling tools for performing CC. Concrete may be pumped from an external storage tank 250 to an end-effector 256 on the end-effector platform 202 via a flexible hose 252 that may be suspended by cables 254, as shown in FIG. 11.

The upper cables 224 essentially support the weight of the end-effector platform 202, while the lower cables 220, 222 may provide translation-only motion. For each pair of cables 220, 222, the two cables 220, 222 may be controlled such that they have the same length. For example, this can be accomplished by reeling in each pair of cables 220, 222 with a single motor (not shown). As a result, a parallelogram may be formed by each pair of cables 220, 222 and, for example, the corresponding horizontal crossbar 244 and the side of the end-effector platform 202 to which the two cables 220, 222 are releasably attached. By maintaining this parallelism, translation-only motion can be provided. This simplifies control of the $C^4$ robot system 200 and maneuvering of the end-effector platform 202 (e.g., including a end-effector, robot, or manipulator) and reduces the complexity of the forward kinematics solution. Note that at least three sets of the parallel cables 220, 222 are necessary to provide generally translation-only motion much like the three sets of parallel links in the well-known Delta robot (see Clavel, Delta: a fast robot with parallel geometry, Proceedings of the 18th International Symposium on Industrial Robot, 1988). The content of the Clavel document is fully incorporated herein by reference in its entirety. The addition of the fourth set of parallel links may allow the footprint of the 3D workspace for the $C^4$ robot system 200 to more efficiently fit the footprint of the desired work site or the desired structure to be constructed.

As shown, the $C^4$ robot system 200 may be fully-constrained, may have high stiffness, and may exert arbitrary forces and moments. Fully-constrained cable robots may have problems with cables interfering with each other and with surrounding objects. While the arrangement of the cables limits interference between cables, it does not prevent interference, for example, with the structure being constructed. In order to address this problem, the horizontal crossbars 244 on the vertical support members 204, 206, 208, 210 may be actuated vertically. Each horizontal crossbar 244 can be independently actuated up and down along the corresponding vertical support member 204, 206, 208, or 210. This enables the $C^4$ robot system 200 to continuously reconfigure itself in order to avoid collisions between the lower cables 220, 222 and, for example, the structure being constructed.

With reference to FIG. 12A, the vertical support member 204 of the $C^4$ robot system 200 is shown with the horizontal crossbar 244 at a low position near the lower horizontal member 246. FIG. 12B shows the horizontal crossbar 244 after being actuated to a higher position. Actuation of the horizontal crossbar 244 can be accomplished via an actuation mechanism 272. The actuation mechanism 272, for example, may include a hydraulic piston, a gear or chain drive, or a cable drive. The actuation mechanism 272 may be properly shrouded to limit jamming due to construction debris. The configuration of the cables 220, 222, 224 allows for simplified, generally translation-only motion as well as simplified forward and inverse position kinematics. The translational motion may be accomplished by keeping the lengths of any two paired parallel cables 220, 222 the same. In addition to simplifying the kinematic equations, this simplifies control of the $C^4$ robot system 200 and maneuvering of the end-effector platform 202.

Using the $C^4$ robot system 200 to construct buildings may be accomplished as described below. The $C^4$ robot system 200 may be transported to a work site with various elements disassembled and stowed. The $C^4$ robot system 200 may be quite compact when stowed because the cables 220, 222, 224 can be reeled in and the rigid frame may be constructed using truss-like vertical support members 204, 206, 208, 210, lower horizontal members 246, and upper horizontal members 248 that can be assembled and disassembled. Once at the construction site, the rigid frame 204, 206, 208, 210, 246, 248 may be assembled, the cables 220, 222, 224 may be strung through the pulleys 232, 234, 236 and releasably attached to the end-effector platform 202. Once deployed, rigid frame 204, 206, 208, 210, 246, 248 may be leveled and anchored. Adjustable supports, for example, may be added to the lower horizontal members 246 that allow the rigid frame to be leveled.

After the rigid frame 204, 206, 208, 210, 246, 248 is anchored, the $C^4$ robot system 200 may be indexed, aligned, or calibrated. The construction material (concrete or a similar material), for example, may be prepared and pumped to the end-effector on the end-effector platform 202 (as shown in FIG. 11). Assuming a proper foundation/footing is in place, construction of the structure 258 can then begin. With the vertically-actuated horizontal crossbars 244 set to a relatively low height, the end-effector platform 202 may be controlled to move along a desired trajectory and the end-effector 256 may be controlled to extrude the first layer of the walls of the structure 258. The position of the end-effector platform 202 and end effector 256 may be controlled by actuation of the twelve cables 220, 222, 224, where the length of any two paired parallel cables 220, 222 may be kept the same. As the structure 258 is constructed a layer at a time, the height of the structure 258 will increase, making collisions between the lower cables 220, 222 and the structure 258 more likely. Thus, after several layers have been completed, each of the four vertically-actuated horizontal crossbars 244 may be raised (typically, although not necessarily, the same distance for each horizontal crossbar 244), allowing the $C^4$ robot system 200 to maintain full constraint of the end-effector platform 202 while limiting collisions between the lower cables 220, 222 and the structure 258 (see FIG. 13). The structure 258 may be constructed in a layered fashion, with the horizontal crossbars 244 being raised periodically to avoid collisions. The end-effector platform 202 may include additional end-effectors 256 that can place structural elements, such as header beams for overhangs, windows, or doorframes. This can be accomplished, for example, by mounting one or more serial robot arms to the end-effector platform 202, in similar fashion to the use of multiple end effectors in Khoshnevis 1 (see Khoshnevis 1 for additional details on this process).

Once the structure 258 is completed, the $C^4$ robot system 200 can be moved to a different work site to build another structure. If the next structure is to be nearby, it may not be necessary to completely disassemble the $C^4$ robot system 200. Instead, one of the horizontal members 246, 248 of the rigid frame 204, 206, 208, 210, 246, 248 can be removed and the $C^4$ robot system 200 can be moved (e.g. by the addition of wheels to the frame) away from the first structure 258 and to the site of the second structure. Once all construction near a given location or work area is completed, the $C^4$ robot system 200 can be disassembled and stowed in a compact portable configuration for transport.

Some basic kinematic equations which form the basis for position control algorithms for the end-effector platform of the various configurations of cable robot systems described herein are provided below. The kinematic parameters of the cable robot system are shown in FIG. 14. The rigid frame is assumed to be a rectangular parallelepiped with sides of fixed length $d_x$, $d_y$, $d_z$. The base coordinate frame {B} is attached as shown, fixed to the floor in the center of the XY plane. The end-effector platform is constructed of a rectangular parallelepiped with fixed side lengths $p_X$, $p_Y$, $p_Z$. Though this cable robot system is capable of translational-only motion, the end-effector platform is rotated at assembly relative to the rigid frame. The nozzle frame {N} is attached to the end of the extrusion nozzle; though {N} translates relative to {B}, their orientation is constrained to be always the same. An additional frame {P} is also parallel to {N}, but located at the geometric center of the end-effector rectangular parallelepiped (not shown in FIG. 14).

Due to the arrangement of the lower cables (the pairs of cables are parallel and the horizontal crossbar for each pair is parallel to the corresponding side of the end-effector platform), the orientation of the end-effector platform does not change. This has been proven, but the proof is not included here due to length limitations. The proof is similar to that of the generally translation-only end-effector of the Delta robot (see Clavel). The four pairs of lower cables of lengths have lengths $L_1$, $L_2$, $L_3$, $L_4$, where for pair i each of the cables have length $L_i$. As shown in FIG. 14, the horizontal end-effector platform dimensions are $p_X$ and $p_Y$, which are the same as the corresponding horizontal crossbar lengths. These are actuated to different heights along the vertical support members of the rigid frame to variable heights $h_1$, $h_2$, $h_3$, $h_4$. These heights can allow the cables to be free from interference with, for example, the structure as it is being constructed. When viewed from above (as shown in FIG. 15) the horizontal crossbars and the end-effector platform are rotated 45° from the horizontal members of the rigid frame. This angle was chosen to ensure 3D workspace symmetry.

There are also four upper cables meeting, for example, in a point at the top center of the end-effector platform, with variable lengths $L_5$, $L_6$, $L_7$, $L_8$. It is noted that the upper cables are not required to meet at a common point, nor are they required to meet in the top center of the end-effector platform. In fact, the upper cables are not required to be in any particular relation to each other. It is the relation of an individual upper cable to corresponding parallel lower cables for each vertical support member individually that simplifies position control parameters for the cable robot system. Nevertheless, it may be more practical and may provide further simplification if the geometry of the four sets of upper and parallel lower cables are symmetrical or at least opposing sets of upper and parallel lower cables are symmetrical. These cables are routed through fixed pulleys located at the vertices of the vertical support members as shown in FIGS. 10, 11 and 13.

For parallel cable robot systems, such as this 12-cable-driven cable robot system, the inverse position kinematics is generally straight-forward. The solution simply amounts to forming the known vectors between cable connection points and calculating their Euclidian norms to determine the associated required cable lengths. Persons skilled in the art will recognize the simple nature of these equations, thus further detail is not provided. The forward kinematic equations are described below. However, the concept of virtual cables is discussed first. The virtual cable concept simplifies the derivation of the forward kinematic equations.

The kinematics solutions can be simplified by using a single control point P located at the origin of {P}, the geometric center of the end-effector rectangular parallelepiped. For the lower four parallel cable pairs, four virtual cables may be introduced in place of the eight actual cables. From cable attachment points $P_{ib}$ on the end-effector platform, vectors $p_i$ to P, i=1, 2, 3, 4 may be drawn (see FIG. 15). Since the end-effector platform orientation does not change, the orientations of all $p_i$ are constant. Now, from cable base points $b_{ia}$ on the vertically-translating cable base supports, attach these same vectors $p_i$ to form virtual cable pulley points $b_{iv}$, as shown in FIG. 15. Connect a single virtual cable between the two tips of the two vectors $p_i$, i=1, 2, 3, 4. The length of the virtual cables is also $L_i$, i=1, 2, 3, 4, due to the parallelism. Thus, the real kinematics solutions may be simplified without the loss of generality by controlling the four virtual cables $L_i$ to translate P. Note that FIG. 15 shows the top view for clarity;

all vectors shown are 3D, so their true lengths are not shown but rather the XY planar projections of their true lengths.

The forward position kinematics solution is stated as follows: given the twelve cable lengths $L_{ij}$, calculate, for example, the desired CC nozzle position is $^B P_N = \{x_N y_N z_N\}^T$. In general, forward position kinematics for parallel cable robot systems and cable-suspended robot systems is very challenging because there may be multiple solutions. However, due to the virtual cable simplification discussed above, the current forward position kinematics solution is straightforward and may be solved in closed-form. The center P of the rectangular parallelepiped representing the end-effector platform is simply the intersection of three given spheres. Using the lower virtual cables, one can choose any three of the four virtual cables i=1, 2, 3, 4. Choosing the first three, the forward position kinematics solution for P is found from the intersection of the following three spheres, where each sphere is referred to as (vector center c, scalar radius r):

$$^B P_P \rightarrow (b_{1v}, L_1), (b_{2v}, L_2), (b_{3v}, L_3) \tag{1}$$

where points $b_{iv}$ are the virtual cable pulley points as shown in FIG. 15. A closed-form three spheres' intersection algorithm is presented in Williams II et al., 3D cable-based Cartesian metrology system, Journal of Robotic Systems, Vol. 21, Issue 5, 2004, pp. 237-257 (Williams II-3). The content of the Williams II-3 document is fully incorporated herein by reference in its entirety. There are two solutions, from which the correct solution may easily be selected by computer (the upper solution rather than the lower one, for the lower parallel cable pairs). There is the possibility of imaginary solutions if the input data to the forward position kinematics solution is not consistent (i.e. sensing or modeling errors). There is an algorithmic singularity which may be avoided by proper choice of coordinate frames. Thus, the forward position solution can be found by using three virtual cables out of the twelve active cables. This is possible due to the generally translation-only motion of the end-effector platform using the cable robot system. After the forward position kinematics solution is found, the inverse position kinematics solution may be used to verify that the remaining cable lengths (unused in the forward position kinematics solution) are correct.

There are many alternatives for solving the forward position kinematics solution of the 12-cable robot system. For example, instead of intersecting spheres from three of the four lower virtual cables one can intersect three of the four upper real cables to find point $P_T$ (on top of the end-effector). After the point P is determined from forward position kinematics with the lower virtual cables (or point $P_T$, when using the upper cables), one can calculate a particular end-effector position (e.g., nozzle position).

In practice it may be possible to develop a forward position kinematics solution using all eight cable lengths simultaneously (e.g., four upper real and four lower virtual) to reduce errors in the case of real-world sensing of the cable lengths.

Statics modeling for the 12-cable robot system is described below. For static equilibrium, the sum of external forces and moments exerted on the end-effector platform by the cables must equal the resultant external wrench exerted on the environment. Because of the analogous relationship between cable robots and parallel robots, the well-known Jacobian relationship can be used to express the static equations. Let $F_R$ and $M_R$ be the resultant force and moment, respectively, applied by the end-effector platform to its surroundings (due to interaction forces and moments in, for example, the CC process), expressed at point P in frame $\{P\}$. Position vector $^P P_{CG}$ gives the location of the center of gravity (CG) relative to P. In practice, $^P P_{CG}$ can be non-zero and even changing during the process, for example, as material is pumped in and extruded out. Let $\hat{L}_i$ be the unit vector along cable i, directed away from the end-effector platform. Let $p_i$ be the position vector from the origin of $\{P\}$ to the point of connection of the $i^{th}$ cable to the end-effector platform. Then the wrench $W_R$ applied by the end-effector platform on its surroundings is related to the vector of cable tensions $t=(t_{1a} t_{1b} t_{2a} t_{2b} \ldots t_{4b} t_5 t_6 t_7 t_8)^T$ according to:

$$At + \begin{Bmatrix} mg \\ ^P P_{CG} \times mg \end{Bmatrix} = W_R = \begin{Bmatrix} F_R \\ M_R \end{Bmatrix} \tag{2}$$

where the statics Jacobian A (expressed in $\{B\}$ coordinates) is:

$$A = \begin{bmatrix} \hat{L}_{1a} & \hat{L}_{1b} & \hat{L}_{2a} & \cdots & \hat{L}_7 & \hat{L}_8 \\ p_{1a} \times \hat{L}_{1a} & p_{1b} \times \hat{L}_{1b} & p_{2a} \times \hat{L}_{2a} & \cdots & p_7 \times \hat{L}_7 & p_8 \times \hat{L}_8 \end{bmatrix} \tag{3}$$

where the gravity vector is $g = \{0\ 0\ -g\}^T$ and the end-effector mass is m. The forward statics solution is (2).

The inverse statics solution is more useful, calculating the required cable tensions t given the wrench $W_R$. The statics equations (2) can be inverted in an attempt to support the end-effector platform weight while maintaining all cable tensions positive. This is discussed in more detail below.

For cable robot systems with actuation redundancy, (2) is underconstrained which means that there are infinite solutions to the cable tension vector t to exert the required Cartesian wrench $W_R$. To invert (2) we adapt the well-known particular and homogeneous solution from resolved-rate control of kinematically-redundant serial robots or manipulators:

$$t = A^+ W_R + (I - A^+ A) z \tag{4}$$

where for the 12-cable robot system I is the 12×12 identity matrix, z is an arbitrary 12-vector, and $A^+ = A^T (AA^T)^{-1}$ is the 12×6 underconstrained Moore-Penrose pseudoinverse of A. The first term of (4) is the particular solution $t_p = A^+ W_R$ to achieve the desired wrench, and the second term is the homogeneous solution $t_h = (I - A^+ A) z$ that projects z into the null space of A. Thus, in principle, the second term of (4) may be used to increase cable tensions until all are positive, while not changing the required Cartesian wrench.

The MATLAB function lsqnonneg, which solves the least-squares problem for (2) subject to all non-negative cable tensions, may be used to implement (4). One of the characteristics of the cable robot system is its 3D workspace. Specifically, it is desired that the end-effector or manipulator reach and be able to perform CC tasks at any x-y-z position encompassed by the rigid frame of the cable robot system. Formally, the 3D workspace of the cable robot system may be defined as the set of all x-y-z positions that the point P can attain (in $\{B\}$) while maintaining full constraint of the end-effector platform and being able to exert a specified set of forces and moments on its surroundings with all non-negative cable tensions and without any of the cables exceeding their upper tension limits. This has also been termed the "wrench-feasible workspace" of a cable robot system (see Bosscher, Disturbance robustness measures and wrench-feasible workspace generation techniques for cable-driven robots, PhD thesis, Georgia Institute of Technology, Atlanta, Ga., November 2004 (Bosscher 2)). The content of the Bosscher 2 document is fully incorporated herein by reference in its entirety.

In order to investigate the 3D workspace of the cable robot system, an example geometry may be chosen and the 3D workspace generated numerically using MATLAB. While this geometry is not necessarily exactly what will be used in practice, it is sufficiently "generic" that the resulting trends are expected to generalize. This example geometry consists of a 1 m cube end-effector platform manipulated within a 50 m cube rigid frame. Due to the end-effector platform dimensions, each of the horizontal crossbars is 1 m wide. The end-effector platform has a mass of 1000 N and the maximum allowable tension in a cable is 10 kN. The space within the rigid frame is divided, for example, into 2 m cubes (i.e., 8 m$^3$) for purposes of resolution. In addition to supporting the weight of the end-effector platform, at each position the cable robot system exerts a force of ±450 N in the x, y and z directions and a moment of ±200 N·m about the x, y and z axes. For each of these loading conditions the tensions in the cables are determined. Since statics equations of the end-effector platform are underdetermined, the cable tensions cannot be determined uniquely. The MATLAB function lsqnonneg, which solves the least-squares problem for (2) subject to all non-negative cable tensions, may be used to resolve the cable tensions. The maximum single cable tension may be determined for each individual loading condition, and then the overall maximum tension (the maximum single cable tension considering all of the loading conditions) may be determined for the pose.

FIGS. 16-22 show the results of this simulation. FIG. 16 shows the 3D workspace of the cable robot system with the horizontal crossbars all set to a height of 0 m. Every position that is reachable with acceptable cable tensions (0≦$t_i$≦10 kN) is represented by a shaded box, with the shading of the box representing the overall maximum tension for the pose. The shading key for FIGS. 16-22 is given in FIG. 16. The rigid frame of the cable robot system is represented by the cube surrounding the 3D workspace and the locations of the pulleys for the upper and lower cables are represented by circles along the vertical legs of the cube. In FIG. 16, the 3D workspace of the cable robot system is large, filling a majority of the volume within the rigid frame. Due to the symmetry of the exemplary cable robot system geometry, the 3D workspace is also symmetric.

The 3D workspace of FIG. 16 is sliced along the x=0 plane and the y=0 plane, resulting in a quarter section of the 3D workspace shown in FIG. 17. This section reveals that the interior of the 3D workspace has generally low tensions in the cables, which is desirable. Because the end-effector platform will primarily operate at low elevation in this 3D workspace (i.e. once the structure under construction is built up a few meters, the horizontal crossbars may be raised to avoid interference), the structure of the 3D workspace near its bottom is of particular interest. Accordingly, consider FIG. 18, which is the 3D workspace of FIG. 16 sliced along the z=3 m plane. Again we can see that the interior of the 3D workspace has generally low tensions, with the possibility of higher tensions occurring near the edges of the 3D workspace. This plot indicates that a robot of this geometry could safely construct a structure with a foundation that is contained within a roughly 44×44 m area.

As construction of the building or structure continues, the horizontal crossbars may be raised in order to avoid interference of the cables with the building under construction. The horizontal crossbars can be raised a few meters at a time. As a representative example the 3D workspace of the cable robot system is shown in FIG. 19 with the horizontal crossbars all set to a height of 25 m. Again the 3D workspace is fairly large, filling the majority of the space from z=25 to 50 m in the frame. More importantly, the 3D workspace is wide in the vicinity of z=25 m, where the end-effector will be operating during this stage of construction. This can be seen in FIG. 20, where the 3D workspace of FIG. 19 is sliced along the z=28 m plane. Again, the interior of the 3D workspace has generally low tensions with the possibility of higher tensions occurring near the edges of the 3D workspace. In addition, the usable area of this portion of the 3D workspace is still approximately 44×44 m.

Lastly, the 3D workspace of the cable robot system with the horizontal crossbars raised to 40 m is considered. This is near the maximum expected height for the horizontal crossbars. The resulting 3D workspace of the cable robot system is shown in FIG. 21. The 3D workspace is not particularly large, however the 3D workspace is very wide in the vicinity of z=40 m, where the end-effector platform will be operating during this stage of construction. This can be seen in FIG. 22, where the 3D workspace of FIG. 21 is sliced along the z=43 m plane. The interior of this section has larger tensions than those seen in FIG. 18 and FIG. 20, but none higher than 4 kN. Given the usable area of this portion of the 3D workspace, it appears that the maximum size building that can be constructed with this cable robot system using the our example geometry of 50×50×50 m, is approximately 44×44×40 m, which is very effective considering the 50 m cube rigid frame.

An alternative geometry of the cable robot system is shown in FIG. 23. In this configuration the horizontal crossbars are moved to the top corners of the rigid frame and are fixed rigidly to the rigid frame (rather than being vertically actuated). The parallel cables, for example, are connected to the lower corners of the end-effector platform. The single cables (previously the upper cables) are now connected from the end-effector platform to the bottom corners of the rigid frame. These cables, for example, connect to the top edges of the end-effector platform at the midpoints of the respective edges. In addition, the connection points of the lower "single" cables to the rigid frame are actuated vertically along the vertical support member (in the same manner that the horizontal crossbars were actuated in the configuration described above with reference to FIGS. 10-21).

The end-effector platform is used in the same manner as before: each pair of parallel cables are actuated together such that they maintain the same length as each other. By actuating the single cables vertically, collisions between the lower cables and the building can be avoided.

In this alternative geometry of the cable robot system, the weight of the end-effector platform is primarily borne by the parallel cables. As mentioned above, if cables are lightly loaded, they may sag, which can cause inaccuracies in the position of the end-effector platform. In particular, because the parallel cables provide generally translation-only behavior of the end-effector platform, keeping these cables straight (i.e., tight) is desired. Having the parallel cables loaded by the weight of the end-effector platform may keep them straighter (i.e., tighter). Additionally, in this alternative geometry of the cable robot system, the arrangement of the cables may allow the end-effector platform to better resist moments that are applied to the end-effector (i.e. the cable robot system may have higher rotational stiffness), leading to better performance of the cable robot system. This may also provide a larger 3D workspace for the cable robot system. This geometry of the cable robot system also avoids certain challenges with actuating the horizontal crossbars. For example, it may be difficult to actuate the horizontal crossbars vertically while at the same time providing the rigidity necessary to maintain the orientation of the horizontal crossbars. Rigidly attaching the horizontal crossbars to the rigid frame may reduce the complexity of the rigid frame and horizontal crossbars.

In summary, the cable robot system provides a geometry that is capable of simplified, generally translation-only motion and highly simplified kinematic equations. The use of actuated cable mounts allows on-line reconfiguration of the cable robot system to eliminate cable interference while maintaining full constraint of the end-effector platform. The cable robot system, for example, may be used to construct large structures using CC practices. In particular, cost is reduced and portability is improved over previous systems used construct structures using CC practices. As the exemplary 3D workspace analysis above shows, the rigid frame of the cable robot system can be slightly larger than the structure or building to be constructed.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. An apparatus, including:
   an end-effector platform positioned and maneuvered within a three-dimensional workspace;
   at least three vertical support members positioned outside the three-dimensional workspace;
   at least three adjustable cables routed from each vertical support member and releasably secured to the end-effector platform to apply upward and downward tension to the end-effector platform, wherein the adjustable cables are adjustably extendable and retractable in a coordinated fashion to maneuver the end-effector platform such that an adjustable portion of each adjustable cable spans from the corresponding vertical support member to the end-effector platform, wherein at least two of the adjustable portions associated with each vertical support member are generally in parallel relation to each other; and
   respective first and second cable guides, movably secured to at least one of the vertical support members, routing the two adjustable cables having the generally parallel adjustable portions, the first and second cable guides being adjustably raisable and lowerable along the respective vertical support member.

2. The apparatus of claim 1 wherein the two adjustable portions in parallel relation to each other form opposite sides of an adaptive parallelogram.

3. The apparatus of claim 1 wherein the adjustable cables are routed from the vertical support members and releasably secured to the end-effector platform to generally limit rotation of the end-effector platform.

4. The apparatus of claim 1, further including:
   a respective third cable guide on the at least one of the vertical support members, routing the third adjustable cable.

5. The apparatus of claim 4 wherein the first and second cable guides are horizontally spaced from each other.

6. The apparatus of claim 5 wherein the corresponding first and second adjustable cables apply at least a portion of the downward tension to the end-effector platform and the third adjustable cable applies at least a portion of the upward tension to the end-effector platform.

7. The apparatus of claim 5 wherein the first and second adjustable cables apply at least a portion of the upward tension to the end-effector platform and the third adjustable cable applies at least a portion of the downward tension to the end-effector platform.

8. The apparatus of claim 7 wherein the third cable guide is adjustably raised and lowered along the corresponding vertical support member.

9. The apparatus of claim 1 wherein the vertical support members are generally proportionately spaced outside the three-dimensional workspace.

10. An apparatus, including:
    an end-effector platform positioned within a three-dimensional workspace maneuverable within the three-dimensional workspace;
    three vertical support members positioned outside the three-dimensional workspace;
    three adjustable cables routed from each vertical support member and releasably secured to the end-effector platform to apply upward and downward tension to the end-effector platform, wherein the adjustable cables are adjustably extendable and raisable in a coordinated fashion to maneuver the end-effector platform such that an adjustable portion of each adjustable cable spans from the corresponding vertical support member to the end-effector platform, wherein two adjustable portions associated with each vertical support member are generally in parallel relation to each other; and
    respective first, second, and third cable guides, secured to each of the vertical support members, respectively routing the first, second, and third adjustable cables associated with the corresponding vertical support member, at least one of i) the first and second cable guides being movably secured to the corresponding vertical support member and adjustably raised and lowered, relative to the respective third cable guide, along the corresponding vertical support member and ii) the third cable guide being movably secured to the corresponding vertical support member and adjustably raisable and lowerable, relative to the respective first and second cable guides, along the corresponding vertical support member.

11. The apparatus of claim 10 wherein the two adjustable portions are in parallel relation to each other form opposite sides of an adaptive parallelogram.

12. The apparatus of claim 10 wherein the first and second cable guides are horizontally spaced from each other, said corresponding first and second adjustable cables being the adjustable cables associated with the corresponding vertical support member that have adjustable portions in parallel relation to each other.

13. The apparatus of claim 12 wherein the corresponding first and second adjustable cables apply at least a portion of the downward tension to the end-effector platform and the third adjustable cable applies at least a portion of the upward tension to the end-effector platform.

14. The apparatus of claim 12 wherein the first and second adjustable cables apply at least a portion of the upward tension to the end-effector platform and the third adjustable cable applies at least a portion of the downward tension to the end-effector platform.

15. The apparatus of claim 10, further including:
a fourth vertical support member positioned outside the three-dimensional workspace, wherein the vertical support members are spaced around the outside of the three-dimensional workspace in a generally rectangular pattern.

16. The apparatus of claim 10, further including:
a fourth vertical support member positioned outside the three-dimensional workspace, wherein the vertical support members are spaced around the outside of the three-dimensional workspace in a generally square pattern.

17. A method, including:
a) positioning an end-effector platform within a three-dimensional workspace;
b) positioning at least three vertical support members outside the three-dimensional workspace;
c) routing at least three adjustable cables from each vertical support member and releasably securing each adjustable cable to the end-effector platform to respectively apply upward or downward tensions to the platform;
d) adjustably extending and retracting the adjustable cables in a coordinated fashion to maneuver the end-effector platform such that an adjustable portion of each adjustable cable spans from the corresponding vertical support member to the end-effector platform, wherein at least two of the adjustable portions associated with each vertical support member are generally in parallel relation to each other;
e) respectively routing first, second, and third adjustable cables of the at least three adjustable cables associated with at least one vertical support member through first, second, and third cable guides associated with the at least one vertical support member; and
f) adjustably raising and lowering at least one of the cable guides along the corresponding vertical support member.

18. The method of claim 17 wherein the adjustably extending in d) includes:
forming opposite sides of an adaptive parallelogram from the two adjustable portions generally in parallel relation to each other.

19. The method of claim 17 wherein the routing and securing in c) include:
generally limiting rotation of the end-effector platform in conjunction with the extending and retracting in d).

20. The method of claim 17, further including:
g) horizontally spacing the first and second cable guides from each other, said corresponding first and second adjustable cables being the adjustable cables associated with the at least one vertical support member that have adjustable portions in parallel relation to each other.

21. The method of claim 20, further including:
h) applying at least a portion of the downward tension in c) via the corresponding first and second adjustable cables; and
i) applying at least a portion of the upward tension in c) via the corresponding third adjustable cable.

22. The method of claim 21, wherein the adjustably raising and lowering of f) includes:
j) adjustably raising and lowering the first and second cable guides along the corresponding vertical support member.

23. The method of claim 20, further including:
h) applying at least a portion of the upward tension in c) via the first and second adjustable cables; and
i) applying at least a portion of the downward tension in c) via the corresponding third adjustable cable.

24. The method of claim 23, wherein the adjustably raising and lowering of f) includes:
j) adjustably raising and lowering the third cable guide along the corresponding vertical support member.

25. The method of claim 17, further including:
g) generally proportionately spacing the vertical support members outside the three-dimensional workspace.

* * * * *